(12) United States Patent
Crawford et al.

(10) Patent No.: US 8,895,654 B2
(45) Date of Patent: Nov. 25, 2014

(54) POLYESTER COMPOSITIONS WHICH COMPRISE SPIRO-GLYCOL, CYCLOHEXANEDIMETHANOL, AND TEREPHTHALIC ACID

(75) Inventors: Emmett Dudley Crawford, Kingsport, TN (US); Gary Wayne Connell, Church Hill, TN (US)

(73) Assignee: Eastman Chemical Company, Kingsport, TN (US)

( * ) Notice: Subject to any disclaimer, the term of this patent is extended or adjusted under 35 U.S.C. 154(b) by 564 days.

(21) Appl. No.: 12/338,453

(22) Filed: Dec. 18, 2008

(65) Prior Publication Data
US 2010/0160549 A1   Jun. 24, 2010

(51) Int. Cl.
   C08G 18/42   (2006.01)
   C08G 63/672  (2006.01)
   C08L 67/02   (2006.01)
   C08G 63/199  (2006.01)

(52) U.S. Cl.
   CPC .................................. *C08G 63/199* (2013.01)
   USPC ........... 524/500; 524/605; 525/437; 528/272; 528/307

(58) Field of Classification Search
   CPC .. C08G 63/127; C08G 63/137; C08G 63/183; C08G 63/199; C08G 63/16; C08L 67/02
   USPC ........... 524/500, 605; 525/437; 528/272, 307
   See application file for complete search history.

(56) References Cited

U.S. PATENT DOCUMENTS

| | | |
|---|---|---|
| 1,602,699 A | 10/1926 | Nightingale |
| 2,160,841 A | 6/1939 | Dreyfus |
| 2,202,046 A | 5/1940 | Dreyfus et al. |
| 2,278,537 A | 4/1942 | Dreyfus et al. |
| 2,720,507 A | 10/1955 | Caldwell |
| 2,806,064 A | 9/1957 | McKlveen |
| 2,901,466 A | 8/1959 | Kibler |
| 2,936,324 A | 5/1960 | Hasek et al. |
| 3,000,906 A | 9/1961 | Hasek et al. |
| 3,030,335 A | 4/1962 | Goldberg |
| 3,062,852 A | 11/1962 | Martin et al. |
| 3,075,952 A | 1/1963 | Coover et al. |
| 3,091,600 A | 5/1963 | Caldwell et al. |
| 3,169,121 A | 2/1965 | Goldberg et al. |
| 3,190,928 A | 6/1965 | Elam et al. |
| 3,201,474 A | 8/1965 | Hasek et al. |
| 3,207,814 A | 9/1965 | Goldberg et al. |
| 3,218,372 A | 11/1965 | Okamura et al. |
| 3,227,764 A | 1/1966 | Martin et al. |
| 3,236,899 A | 2/1966 | Clark |
| 3,249,652 A | 5/1966 | Quisenberry |
| 3,259,469 A | 7/1966 | Painter et al. |
| 3,287,390 A | 11/1966 | Poos et al. |
| 3,288,854 A | 11/1966 | Martin |
| 3,312,741 A | 4/1967 | Martin |
| 3,313,777 A | 4/1967 | Elam et al. |
| 3,317,466 A | 5/1967 | Caldwell et al. |
| 3,329,722 A | 7/1967 | Rylander |
| 3,360,547 A | 12/1967 | Wilson et al. |
| 3,366,689 A | 1/1968 | Maeda et al. |
| 3,386,935 A | 6/1968 | Jackson et al. |
| 3,403,181 A | 9/1968 | Painter et al. |
| T858,012 I4 | 1/1969 | Caldwell et al. |
| 3,484,339 A | 12/1969 | Caldwell |
| 3,502,620 A | 3/1970 | Caldwell |
| T873,016 I4 | 4/1970 | Gilkey et al. |
| 3,541,059 A | 11/1970 | Schaper |
| 3,546,177 A | 12/1970 | Kibler et al. |
| 3,629,202 A | 12/1971 | Gilkey et al. |
| RE27,682 E | 6/1973 | Hermann et al. |
| 3,772,405 A | 11/1973 | Hamb |
| 3,799,953 A | 3/1974 | Freitag et al. |
| 3,907,754 A | 9/1975 | Tershansy et al. |
| 3,915,913 A | 10/1975 | Jackson, Jr. et al. |
| 3,962,189 A | 6/1976 | Russin et al. |
| 4,001,184 A | 1/1977 | Scott |
| 4,010,145 A | 3/1977 | Russin et al. |
| 4,046,933 A | 9/1977 | Stefanik |
| 4,056,504 A | 11/1977 | Grundmeier et al. |

(Continued)

FOREIGN PATENT DOCUMENTS

| | | |
|---|---|---|
| BE | 615850 | 4/1962 |
| CA | 2035149 | 8/1991 |

(Continued)

OTHER PUBLICATIONS

Abstract of U.S. Defense Publication T869,015, 869 O.G. 714, Dec. 16, 1969.

(Continued)

*Primary Examiner* — Michael Pepitone
(74) *Attorney, Agent, or Firm* — Betty J. Boshears

(57) ABSTRACT

Described as one aspect of the invention are polyester compositions comprising at least one polyester which comprises:
  (a) a dicarboxylic acid component comprising:
    (i) about 80 to about 100 mole % of terephthalic acid residues;
    (ii) about 0 to about 20 mole % of aromatic and/or aliphatic dicarboxylic acid residues having up to 20 carbon atoms; and
  (b) a glycol component comprising:
    (i) about 1 to about 49 mole % spiro-glycol residues; and
    (ii) about 51 to about 99 mole % at least one glycol chosen from at least one of 1,4-cyclohexanedimethanol residues and 2,2,4,4-tetramethyl-1,3-cyclobutanediol residues;
wherein the total mole % of the dicarboxylic acid component is 100 mole %, and wherein the total mole % of the glycol component is 100 mole %.

22 Claims, No Drawings

(56) References Cited

U.S. PATENT DOCUMENTS

| | | |
|---|---|---|
| 4,084,889 A | 4/1978 | Vischer, Jr. |
| 4,125,572 A | 11/1978 | Scott |
| 4,156,069 A | 5/1979 | Prevorsek et al. |
| 4,160,383 A | 7/1979 | Rauschenberger |
| 4,185,009 A | 1/1980 | Idel et al. |
| 4,188,314 A | 2/1980 | Fox et al. |
| 4,194,038 A | 3/1980 | Baker et al. |
| 4,263,364 A | 4/1981 | Seymour et al. |
| 4,356,299 A | 10/1982 | Cholod et al. |
| 4,367,186 A | 1/1983 | Adelmann et al. |
| 4,379,802 A | 4/1983 | Weaver et al. |
| 4,384,106 A | 5/1983 | Go et al. |
| 4,391,954 A | 7/1983 | Scott |
| 4,424,140 A | 1/1984 | Weinberg et al. |
| 4,426,512 A | 1/1984 | Barbee et al. |
| 4,427,614 A | 1/1984 | Barham et al. |
| 4,430,484 A | 2/1984 | Quinn |
| 4,431,793 A | 2/1984 | Rosenquist |
| 4,452,933 A | 6/1984 | McCready |
| 4,465,820 A | 8/1984 | Miller et al. |
| 4,469,861 A | 9/1984 | Mark et al. |
| 4,480,086 A | 10/1984 | O'Neill |
| 4,525,504 A | 6/1985 | Morris et al. |
| 4,578,295 A | 3/1986 | Jabarin |
| 4,578,437 A | 3/1986 | Light et al. |
| 4,642,959 A | 2/1987 | Swiech, Jr. et al. |
| 4,738,880 A | 4/1988 | Asada et al. |
| 4,749,773 A | 6/1988 | Weaver et al. |
| 4,786,692 A | 11/1988 | Allen et al. |
| 4,816,308 A | 3/1989 | Shimizu et al. |
| 4,826,903 A | 5/1989 | Weaver et al. |
| 4,845,188 A | 7/1989 | Weaver et al. |
| 4,880,592 A | 11/1989 | Martini et al. |
| 4,882,412 A | 11/1989 | Weaver et al. |
| 4,892,922 A | 1/1990 | Weaver et al. |
| 4,892,923 A | 1/1990 | Weaver et al. |
| 4,937,134 A | 6/1990 | Schrenk et al. |
| 4,939,186 A | 7/1990 | Nelson et al. |
| 4,976,057 A | 12/1990 | Bianchi |
| 4,981,898 A | 1/1991 | Bassett |
| 4,985,342 A | 1/1991 | Muramoto et al. |
| 5,017,679 A | 5/1991 | Chang et al. |
| 5,017,680 A | 5/1991 | Sublett |
| 5,034,252 A | 7/1991 | Nilsson et al. |
| 5,104,450 A | 4/1992 | Sand et al. |
| 5,118,760 A | 6/1992 | Blakely et al. |
| 5,118,847 A | 6/1992 | Jackson et al. |
| 5,142,088 A | 8/1992 | Phelps et al. |
| 5,169,994 A | 12/1992 | Sumner, Jr. et al. |
| 5,183,863 A | 2/1993 | Nakamura et al. |
| 5,191,038 A | 3/1993 | Krabbenhoft et al. |
| 5,207,967 A | 5/1993 | Small et al. |
| 5,219,510 A | 6/1993 | Machell et al. |
| 5,224,958 A | 7/1993 | Warunek et al. |
| 5,239,020 A | 8/1993 | Morris |
| 5,256,761 A | 10/1993 | Blount, Jr. |
| 5,258,556 A | 11/1993 | Sumner, Jr. et al. |
| 5,268,219 A | 12/1993 | Harada et al. |
| 5,288,715 A | 2/1994 | Machell et al. |
| 5,288,764 A | 2/1994 | Rotter et al. |
| 5,292,783 A | 3/1994 | Buchanan et al. |
| 5,310,611 A | 5/1994 | Okabe et al. |
| 5,310,787 A | 5/1994 | Kutsuwa et al. |
| 5,326,584 A | 7/1994 | Kamel et al. |
| 5,326,821 A * | 7/1994 | Sasaki et al. .................. 525/124 |
| 5,331,034 A | 7/1994 | Pfahler et al. |
| 5,333,073 A | 7/1994 | Suzuki |
| 5,354,791 A | 10/1994 | Gallucci |
| 5,372,864 A | 12/1994 | Weaver et al. |
| 5,372,879 A | 12/1994 | Handa et al. |
| 5,378,796 A | 1/1995 | George et al. |
| 5,382,292 A | 1/1995 | Conroy et al. |
| 5,384,377 A | 1/1995 | Weaver et al. |
| 5,475,144 A | 12/1995 | Watson et al. |
| 5,480,926 A | 1/1996 | Fagerburg et al. |
| 5,486,562 A | 1/1996 | Borman et al. |
| 5,489,665 A | 2/1996 | Yamato et al. |
| 5,494,992 A | 2/1996 | Kanno et al. |
| 5,498,668 A | 3/1996 | Scott |
| 5,498,688 A | 3/1996 | Oshino et al. |
| 5,506,014 A | 4/1996 | Minnick |
| 5,523,382 A | 6/1996 | Beavers et al. |
| 5,534,609 A | 7/1996 | Lewis et al. |
| 5,552,512 A | 9/1996 | Sublett |
| 5,591,530 A | 1/1997 | Warner et al. |
| 5,633,340 A | 5/1997 | Hoffman et al. |
| 5,650,453 A | 7/1997 | Eckberg et al. |
| 5,654,347 A | 8/1997 | Khemani et al. |
| 5,656,715 A | 8/1997 | Dickerson et al. |
| 5,668,243 A | 9/1997 | Yau et al. |
| 5,681,918 A | 10/1997 | Adams et al. |
| 5,688,874 A | 11/1997 | Hoffman |
| 5,696,176 A | 12/1997 | Khemani et al. |
| 5,705,575 A | 1/1998 | Kelsey |
| 5,783,307 A | 7/1998 | Fagerburg et al. |
| 5,804,617 A | 9/1998 | Hoffman et al. |
| 5,814,679 A | 9/1998 | Eckberg et al. |
| 5,859,116 A | 1/1999 | Shih |
| 5,863,622 A | 1/1999 | Jester |
| 5,902,631 A | 5/1999 | Wang et al. |
| 5,907,026 A | 5/1999 | Factor et al. |
| 5,942,585 A | 8/1999 | Scott et al. |
| 5,955,565 A | 9/1999 | Morris et al. |
| 5,958,539 A | 9/1999 | Eckart et al. |
| 5,958,581 A | 9/1999 | Khanarian et al. |
| 5,959,066 A | 9/1999 | Charbonneau et al. |
| 5,962,625 A | 10/1999 | Yau |
| 5,977,347 A | 11/1999 | Shuto et al. |
| 5,989,663 A | 11/1999 | Morris et al. |
| 6,001,910 A | 12/1999 | Blumenthal et al. |
| 6,005,059 A | 12/1999 | Scott et al. |
| 6,011,124 A | 1/2000 | Scott et al. |
| 6,012,597 A | 1/2000 | Nishihara et al. |
| 6,022,603 A | 2/2000 | Umeda et al. |
| 6,025,061 A | 2/2000 | Khanarian et al. |
| 6,030,671 A | 2/2000 | Yang et al. |
| 6,037,424 A | 3/2000 | Scott et al. |
| 6,043,322 A | 3/2000 | Scott et al. |
| 6,044,996 A | 4/2000 | Carew et al. |
| 6,063,464 A | 5/2000 | Charbonneau et al. |
| 6,063,465 A | 5/2000 | Charbonneau et al. |
| 6,063,495 A | 5/2000 | Charbonneau et al. |
| 6,084,019 A | 7/2000 | Matayabas, Jr. et al. |
| 6,096,854 A | 8/2000 | Morris et al. |
| 6,114,575 A | 9/2000 | McMahon et al. |
| 6,120,477 A | 9/2000 | Campbell et al. |
| 6,120,889 A | 9/2000 | Turner et al. |
| 6,126,992 A | 10/2000 | Khanarian et al. |
| 6,127,492 A | 10/2000 | Nagashima et al. |
| 6,146,228 A | 11/2000 | Mougin et al. |
| 6,150,494 A | 11/2000 | Wang et al. |
| 6,183,848 B1 | 2/2001 | Turner et al. |
| 6,191,209 B1 | 2/2001 | Andrews et al. |
| 6,211,309 B1 | 4/2001 | McIntosh et al. |
| 6,221,556 B1 | 4/2001 | Gallucci et al. |
| 6,225,436 B1 | 5/2001 | Eiffler et al. |
| 6,232,504 B1 | 5/2001 | Barteau et al. |
| 6,239,910 B1 | 5/2001 | Kim et al. |
| 6,255,523 B1 | 7/2001 | Panandiker et al. |
| 6,287,656 B1 | 9/2001 | Turner et al. |
| 6,307,006 B1 | 10/2001 | Konig et al. |
| 6,309,718 B1 | 10/2001 | Sprayberry |
| 6,320,042 B1 | 11/2001 | Michihata et al. |
| 6,323,291 B1 | 11/2001 | Mason et al. |
| 6,323,304 B1 | 11/2001 | Lemmon et al. |
| 6,342,304 B1 | 1/2002 | Buchanan et al. |
| 6,352,783 B1 | 3/2002 | Fagerburg |
| 6,354,986 B1 | 3/2002 | Hlavinka et al. |
| 6,359,070 B1 | 3/2002 | Khanarian et al. |
| 6,406,792 B1 | 6/2002 | Briquet et al. |
| 6,437,083 B1 | 8/2002 | Brack et al. |
| 6,448,334 B1 | 9/2002 | Verhoogt et al. |
| 6,458,468 B1 | 10/2002 | Moskala et al. |
| 6,504,002 B1 | 1/2003 | Karlik et al. |

(56) References Cited

U.S. PATENT DOCUMENTS

| | | |
|---|---|---|
| 6,559,272 B1 | 5/2003 | Jeon et al. |
| 6,573,328 B2 | 6/2003 | Kropp et al. |
| 6,599,994 B2 | 7/2003 | Shelby et al. |
| 6,639,067 B1 | 10/2003 | Brinegar et al. |
| 6,656,577 B1 | 12/2003 | Adelman et al. |
| 6,669,980 B2 | 12/2003 | Hansen |
| 6,723,768 B2 | 4/2004 | Adams et al. |
| 6,733,716 B2 | 5/2004 | Belcher |
| 6,740,377 B2 | 5/2004 | Pecorini et al. |
| 6,773,653 B2 | 8/2004 | Miller et al. |
| 6,818,293 B1 | 11/2004 | Keep et al. |
| 6,818,730 B2 | 11/2004 | Brandenburg et al. |
| 6,846,440 B2 | 1/2005 | Flynn et al. |
| 6,846,508 B1 | 1/2005 | Colas et al. |
| 6,896,966 B2 | 5/2005 | Crawford et al. |
| 6,908,650 B2 | 6/2005 | Odorisio et al. |
| 6,914,120 B2 | 7/2005 | Germroth et al. |
| 7,037,576 B2 | 5/2006 | Willham et al. |
| 7,048,978 B2 | 5/2006 | Tanaka et al. |
| 7,053,143 B2 | 5/2006 | Mori et al. |
| 7,122,661 B2 | 10/2006 | Fleche et al. |
| 7,169,880 B2 | 1/2007 | Shelby et al. |
| 7,297,755 B2 | 11/2007 | Shelby et al. |
| 7,354,628 B2 | 4/2008 | Steube |
| 7,375,154 B2 | 5/2008 | Stafford et al. |
| 7,427,430 B2 | 9/2008 | Rhee et al. |
| 7,468,409 B2 | 12/2008 | Pearson et al. |
| 7,482,397 B2 | 1/2009 | Pearson et al. |
| 2001/0003419 A1 | 6/2001 | Ribes |
| 2001/0029324 A1 | 10/2001 | Walker et al. |
| 2001/0031805 A1 | 10/2001 | Buhler |
| 2001/0044003 A1 | 11/2001 | Gallucci et al. |
| 2002/0055586 A1 | 5/2002 | Dalgewicz, III et al. |
| 2002/0128357 A1 | 9/2002 | Goossens et al. |
| 2002/0132963 A1 | 9/2002 | Quillen |
| 2002/0137856 A1 | 9/2002 | Andrews et al. |
| 2002/0188092 A1 | 12/2002 | Moskala et al. |
| 2002/0198297 A1 | 12/2002 | Odorisio et al. |
| 2003/0032737 A1 | 2/2003 | Andrews et al. |
| 2003/0060546 A1 | 3/2003 | Moskala et al. |
| 2003/0075516 A1 | 4/2003 | Rothman et al. |
| 2003/0077546 A1 | 4/2003 | Donovan et al. |
| 2003/0135015 A1 | 7/2003 | Fujimaki et al. |
| 2003/0139497 A1 | 7/2003 | Odorisio et al. |
| 2003/0149177 A1 | 8/2003 | Andrews et al. |
| 2003/0169514 A1 | 9/2003 | Bourdelais et al. |
| 2003/0187151 A1 | 10/2003 | Adams et al. |
| 2003/0195295 A1 | 10/2003 | Mahood et al. |
| 2003/0221716 A1 | 12/2003 | Olson |
| 2003/0229181 A1 | 12/2003 | Hariharan et al. |
| 2004/0022526 A1 | 2/2004 | Kuno et al. |
| 2004/0063864 A1 | 4/2004 | Adams et al. |
| 2004/0101687 A1 | 5/2004 | Crawford et al. |
| 2004/0106707 A1 | 6/2004 | Su et al. |
| 2004/0106767 A1 | 6/2004 | Simon et al. |
| 2004/0108623 A1 | 6/2004 | Deeter et al. |
| 2004/0138381 A1 | 7/2004 | Blasius et al. |
| 2004/0145700 A1 | 7/2004 | Miniutti et al. |
| 2004/0164279 A1 | 8/2004 | Stevenson et al. |
| 2004/0202822 A1 | 10/2004 | Bourdelais et al. |
| 2004/0214984 A1 | 10/2004 | Keep et al. |
| 2005/0008885 A1 | 1/2005 | Blakely et al. |
| 2005/0072060 A1 | 4/2005 | Moncho et al. |
| 2005/0075466 A1* | 4/2005 | Oguro et al. ............... 525/439 |
| 2005/0096453 A1 | 5/2005 | Flynn et al. |
| 2005/0101759 A1 | 5/2005 | Odorisio et al. |
| 2005/0113556 A1 | 5/2005 | Strand et al. |
| 2005/0119359 A1 | 6/2005 | Shelby et al. |
| 2005/0124779 A1 | 6/2005 | Shelby et al. |
| 2005/0181155 A1 | 8/2005 | Share et al. |
| 2005/0209435 A1* | 9/2005 | Hirokane et al. ............ 528/272 |
| 2006/0004151 A1 | 1/2006 | Shaikh et al. |
| 2006/0036012 A1 | 2/2006 | Hayes et al. |
| 2006/0094858 A1 | 5/2006 | Turner et al. |
| 2006/0111481 A1 | 5/2006 | Pearson et al. |
| 2006/0111519 A1 | 5/2006 | Strand et al. |
| 2006/0135668 A1 | 6/2006 | Hayes |
| 2006/0146228 A1 | 7/2006 | Sogo et al. |
| 2006/0151907 A1 | 7/2006 | Kashiwabara |
| 2006/0180560 A1 | 8/2006 | Robinson |
| 2006/0197246 A1 | 9/2006 | Hale et al. |
| 2006/0199904 A1 | 9/2006 | Hale et al. |
| 2006/0199919 A1 | 9/2006 | Hale et al. |
| 2006/0228507 A1 | 10/2006 | Hale et al. |
| 2006/0234073 A1 | 10/2006 | Hale et al. |
| 2006/0235167 A1 | 10/2006 | Hale et al. |
| 2006/0247388 A1 | 11/2006 | Hale et al. |
| 2006/0270773 A1 | 11/2006 | Hale et al. |
| 2006/0270806 A1 | 11/2006 | Hale |
| 2007/0049667 A1 | 3/2007 | Kim et al. |
| 2007/0071930 A1 | 3/2007 | Shelby et al. |

FOREIGN PATENT DOCUMENTS

| | | |
|---|---|---|
| DE | 29 21 868 A1 | 12/1980 |
| DE | 197 27 709 | 6/1997 |
| DE | 198 11 773 A1 | 9/1999 |
| EP | 0 039 838 A1 | 11/1981 |
| EP | 0 273 144 | 5/1987 |
| EP | 0 282 277 | 9/1988 |
| EP | 0 372 846 | 6/1990 |
| EP | 0 544 008 A1 | 6/1993 |
| EP | 0 595 413 A1 | 5/1994 |
| EP | 0 698 631 | 2/1996 |
| EP | 0 714 764 A2 | 6/1996 |
| EP | 0 902 052 A1 | 3/1999 |
| EP | 0 930 531 A1 | 7/1999 |
| EP | 1 035 167 A | 9/2000 |
| EP | 1 066 825 A1 | 1/2001 |
| EP | 1 674 496 A1 | 6/2006 |
| FR | 1278284 | 12/1961 |
| FR | 1291273 | 5/1965 |
| FR | 1432471 | 2/1966 |
| FR | 1434658 | 2/1966 |
| FR | 2112400 | 6/1972 |
| GB | 962913 | 7/1964 |
| GB | 1041651 | 9/1966 |
| GB | 1044015 | 9/1966 |
| GB | 1047043 | 11/1966 |
| GB | 1090241 | 11/1967 |
| GB | 1130558 | 10/1968 |
| GB | 1 278 284 | 6/1972 |
| GB | 1364732 | 8/1974 |
| GB | 2216919 A | 10/1989 |
| JP | 56-88440 A | 12/1979 |
| JP | 03207743 | 9/1991 |
| JP | 65-01040 | 2/1994 |
| JP | 9-59371 A | 4/1997 |
| JP | 11-222516 | 8/1999 |
| JP | 2001-066701 | 8/1999 |
| JP | 2000-352620 A | 12/2000 |
| JP | 2001-098086 | 4/2001 |
| JP | 2001214049 | 8/2001 |
| JP | 2003-292593 A | 10/2003 |
| JP | 2004-058565 A | 2/2004 |
| JP | 2004-066624 A | 3/2004 |
| JP | 2004-67973 A | 3/2004 |
| JP | 2004-244497 A | 9/2004 |
| JP | 2004-292558 A | 10/2004 |
| JP | 2005-254757 A | 9/2005 |
| JP | 2007-069914 A | 3/2007 |
| JP | 2007-253491 A | 10/2007 |
| KR | 2001/089942 | 10/2001 |
| KR | 2003/054611 | 7/2003 |
| WO | WO 97/01118 | 1/1997 |
| WO | WO 01/06981 | 2/2001 |
| WO | WO 01/85824 A2 | 11/2001 |
| WO | WO 02/055570 A1 | 7/2002 |
| WO | WO 02/059207 | 8/2002 |
| WO | 2004009146 | 1/2004 |
| WO | WO 2004/039860 | 5/2004 |
| WO | WO 2004/104077 A1 | 12/2004 |
| WO | WO 2004/106988 A2 | 12/2004 |
| WO | WO 2005/007735 A2 | 1/2005 |

(56) References Cited

FOREIGN PATENT DOCUMENTS

| WO | WO 2005/026241 A1 | 3/2005 |
|---|---|---|
| WO | WO 2006-025827 | 3/2006 |
| WO | WO 2006/127755 A2 | 11/2006 |
| WO | WO 2006/127831 A1 | 11/2006 |
| WO | WO 2007/053434 A1 | 5/2007 |
| WO | WO 2007/053548 A2 | 5/2007 |
| WO | WO 2007/053549 A1 | 5/2007 |
| WO | WO 2007/053550 | 5/2007 |
| WO | WO 2007/123631 A | 11/2007 |

OTHER PUBLICATIONS

Abstract of U.S. Defense Publication T875,010, 875 O.G. 342, Jun. 9, 1970.

Chen et al., "The molecular basis for the relationship between the secondary relaxation and mechanical properties of a series of polyester copolymer glasses," Marcromolecules, 32:5944-5955 (1999).

Coover, H. et al., "Copolyester Molding Compositions," Chemical Abstracts Service, XP002391844.

Kelsey, E. et al., "High Impact, Amorphous Terephthalate Copolyesters of Rigid 2,2,4,4-Tetramethyl-1,3-cyclobutanediol with Flexible Diols," MACROMOLECULES, vol. 33, 2000, pp. 5810-5818, American Chemical Society.

"Plastic Additives Handbook," 5th Edition, 2001, pp. 98-108 and pp. 109-112 (Hanser Gardner Publications, Inc., Cincinnati, OH.

Bergen, R. L., Jr., "Stress Cracking of Rigid Thermoplastics," SPE Journal, Jun. 1962.

English language Abstract of JP 02-305816 from Patent Abstracts of Japan, Dec. 19, 1990.

English language translation of Belgian Patent No. BE 615,850, Apr. 13, 1962.

English language translation of French Patent No. FR 1,432,471, Feb. 7, 1966.

English language translation of French Patent No. FR 1,434,658, Feb. 28, 1966.

U.S. Appl. No. 11/390,555, filed Mar. 28, 2006, Emmett Dudley Crawford, et al.
U.S. Appl. No. 11/390,563, filed Mar. 28, 2006, Emmett Dudley Crawford, et al.
U.S. Appl. No. 11/390,629, filed Mar. 28, 2006, Emmett Dudley Crawford, et al.
U.S. Appl. No. 11/390,630, filed Mar. 28, 2006, Emmett Dudley Crawford, et al.
U.S. Appl. No. 11/390,631, filed Mar. 28, 2006, Emmett Dudley Crawford, et al.
U.S. Appl. No. 11/390,654, filed Mar. 28, 2006, Emmett Dudley Crawford, et al.
U.S. Appl. No. 11/390,655, filed Mar. 28, 2006, Emmett Dudley Crawford, et al.
U.S. Appl. No. 11/390,671, filed Mar. 28, 2006, Emmett Dudley Crawford, et al.
U.S. Appl. No. 11/390,672, filed Mar. 28, 2006, Emmett Dudley Crawford, et al.
U.S. Appl. No. 11/390,722, filed Mar. 28, 2006, Emmett Dudley Crawford, et al.
U.S. Appl. No. 11/390,750, filed Mar. 28, 2006, Emmett Dudley Crawford, et al.
U.S. Appl. No. 11/390,751, filed Mar. 28, 2006, Emmett Dudley Crawford, et al.
U.S. Appl. No. 11/390,752, filed Mar. 28, 2006, Emmett Dudley Crawford, et al.
U.S. Appl. No. 11/390,773, filed Mar. 28, 2006, Emmett Dudley Crawford, et al.
U.S. Appl. No. 11/390,793, filed Mar. 28, 2006, Emmett Dudley Crawford, et al.
U.S. Appl. No. 11/390,794, filed Mar. 28, 2006, Emmett Dudley Crawford, et al.
U.S. Appl. No. 11/390,809, filed Mar. 28, 2006, Wesley Raymond Hale, et al.
U.S. Appl. No. 11/390,811, filed Mar. 28, 2006, Emmett Dudley Crawford, et al.
U.S. Appl. No. 11/390,812, filed Mar. 28, 2006, Wesley Raymond Hale, et al.
U.S. Appl. No. 11/390,814, filed Mar. 28, 2006, Emmett Dudley Crawford, et al.
U.S. Appl. No. 11/390,826, filed Mar. 28, 2006, Emmett Dudley Crawford, et al.
U.S. Appl. No. 11/390,827, filed Mar. 28, 2006, Emmett Dudley Crawford, et al.
U.S. Appl. No. 11/390,836, filed Mar. 28, 2006, Emmett Dudley Crawford, et al.
U.S. Appl. No. 11/390,846, filed Mar. 28, 2006, Wesley Raymond Hale, et al.
U.S. Appl. No. 11/390,847, filed Mar. 28, 2006, Emmett Dudley Crawford, et al.
U.S. Appl. No. 11/390,853, filed Mar. 28, 2006, Emmett Dudley Crawford, et al.
U.S. Appl. No. 11/390,858, filed Mar. 28, 2006, Emmett Dudley Crawford, et al.
U.S. Appl. No. 11/390,864, filed Mar. 28, 2006, Wesley Raymond Hale, et al.
U.S. Appl. No. 11/390,865, filed Mar. 28, 2006, Emmett Dudley Crawford, et al.
U.S. Appl. No. 11/390,882, filed Mar. 28, 2006, Emmett Dudley Crawford, et al.
U.S. Appl. No. 11/390,883, filed Mar. 28, 2006, Thomas Joseph Pecorini, et al.
U.S. Appl. No. 11/390,908, filed Mar. 28, 2006, Wesley Raymond Hale, et al.
U.S. Appl. No. 11/391,063, filed Mar. 28, 2006, Emmett Dudley Crawford, et al.
U.S. Appl. No. 11/391,124, filed Mar. 28, 2006, Wesley Raymond Hale, et al.
U.S. Appl. No. 11/391,125, filed Mar. 28, 2006, Emmett Dudley Crawford, et al.
U.S. Appl. No. 11/391,137, filed Mar. 28, 2006, Emmett Dudley Crawford, et al.
U.S. Appl. No. 11/391,156, filed Mar. 28, 2006, Emmett Dudley Crawford, et al.
U.S. Appl. No. 11/391,485, filed Mar. 28, 2006, Emmett Dudley Crawford, et al.
U.S. Appl. No. 11/391,495, filed Mar. 28, 2006, Emmett Dudley Crawford, et al.
U.S. Appl. No. 11/391,505, filed Mar. 28, 2006, Emmett Dudley Crawford, et al.
U.S. Appl. No. 11/391,565, filed Mar. 28, 2006, Emmett Dudley Crawford, et al.
U.S. Appl. No. 11/391,571, filed Mar. 28, 2006, Emmett Dudley Crawford, et al.
U.S. Appl. No. 11/391,576, filed Mar. 28, 2006, Emmett Dudley Crawford, et al.
U.S. Appl. No. 11/391,642, filed Mar. 28, 2006, Emmett Dudley Crawford, et al.
U.S. Appl. No. 11/391,659, filed Mar. 28, 2006, Emmett Dudley Crawford, et al.
U.S. Appl. No. 11/588,524, filed Oct. 27, 2006, Emmett Dudley Crawford, et al.
U.S. Appl. No. 11/588,458, filed Oct. 27, 2006, Emmett Dudley Crawford, et al.
U.S. Appl. No. 11/588,907, filed Oct. 27, 2006, Emmett Dudley Crawford, et al.
U.S. Appl. No. 11/588,527, filed Oct. 27, 2006, Emmett Dudley Crawford, et al.
U.S. Appl. No. 11/588,906, filed Oct. 27, 2006, Ted Calvin Germroth, et al.
U.S. Appl. No. 11/588,883, filed Oct. 27, 2006, Ted Calvin Germroth, et al.
U.S. Appl. No. 11/588,554, filed Oct. 27, 2006, Emmett Dudley Crawford, et al.
U.S. Appl. No. 11/635,434, filed Dec. 7, 2006, Emmett Dudley Crawford.

(56) References Cited

OTHER PUBLICATIONS

U.S. Appl. No. 11/635,433, filed Dec. 7, 2006, Emmett Dudley Crawford.
U.S. Appl. No. 11/439,062, filed May 23, 2006, Wesley Raymond Hale, et al.
U.S. Appl. No. 11/439,340, filed May 23, 2006, Wesley Raymond Hale.
U.S. Appl. No. 11/706,476, filed Feb. 14, 2007, Leslie Shane Moody, et al.
U.S. Appl. No. 11/706,791, filed Feb. 14, 2007, Leslie Shane Moody, et al.
U.S. Appl. No. 11/827,696, filed Jul. 13, 2007, Ryan Thomas Neill, et al.
U.S. Appl. No. 12/091,568, filed Apr. 25, 2008, Emmett Dudley Crawford, et al.
U.S. Appl. No. 12/091,566, filed Apr. 25, 2008, Emmett Dudley Crawford, et al.
U.S. Appl. No. 12/091,570, filed Apr. 25, 2008, Ted Calvin Germroth, et al.
U.S. Appl. No. 12/091,572, filed Apr. 25, 2008, Ted Calvin Germroth, et al.
U.S. Appl. No. 12/294,690, filed Sep. 26, 2008, Ted Calvin Germroth et al.
U.S. Appl. No. 12/294,686, filed Sep. 26, 2008, Ted Calvin Germroth et al.
U.S. Appl. No. 12/274,692, filed Nov. 20, 2008, Thomas Joseph Pecorini et al.
Chapter 4—*Processing of Plastics* in "*Plastics Engineering, $3^{rd\ ed}$*", R.J. Crawford, Butterworth-Heinemann Publisher, 1998, Oxford, England, pp. 245-342.
Fox equation (T.G. Fox, Session J, Bull. Am. Phys. Soc., 1, 123 (1956)).
*The Technology of Plasticizers*, by J. Kern Sears and Joseph R Darby, published by Society of Plastic Engineers/Wiley and Sons, New York, 1982; pp. 136-139.
Coleman et al., "Polymer Reviews—A Practical Guide to Polymer Miscibility," *Polymer 31*, pp. 1187-1203 (1990).
"*Hansen Solubility Parameters, a Users Handbook*", by Charles M. Hansen, Chapter 1, CRC Press, 2000, pp. 1-24.
Martinez et al., "*Phase Behavior and Mechanical Properties of Injection Molded Poly (Ethylene Terephthalate) / Polyarylate Blends*"; Journal of Applied Polymer Science, John Wiley and Sons Inc. New York, US, vol. 45, No. 7, Jul. 5, 1992, p. 1135-1143.
Won Ho Jo et al. : :*Miscibility of poly(ether imide)/poly(ethylene terephthalate) blends*; Polymer Bulletin, Springer, Heidelberg, DE, vol. 33, No. 1, Jun. 1, 1994, p. 113-118 (1994).
Anonymous: "*Poly(ethylene naphthalenedicarboxylate)/ polyetherimide blends*"Research Disclosure, Mason Publications, Hampshire, GB, vol. 283, No. 38, Nov. 1987.
ASTM D1525-06, *Standard Test Method for Vicat Softening Temperature of Plastics*, Mar. 15, 2006.
ASTM D648-06, *Standard Test Method for Deflection Temperature of Plastics Under Flexural Load in the Edgewise Position*, Mar. 15, 2006.
ASTM D256-06, *Standard Test Methods for Determining the Izod Pendulum Impact Resistance of Plastics*, Mar. 15, 2006.
ASTM D790-03, *Standard Test Methods for Flexural Properties of Unreinforced and Reinforced Plastics and Electrical Insulating Materials*, Mar. 10, 2003.
ASTM D638-03, *Standard Test Method for Tensile Properties of Plastics*, Dec. 1, 2003.
ASTM D3418-03, *Transition Temperatures and Enthalpies of Fusion and Crystallization of Polymers by Differential Scanning Calorimetry*, Dec. 1, 2003.
C.I. Constitution No. 515240.
C.I. Constitution No. 515245.
Database WPI, Section Ch, Week 200536, Derwent Publications Ltd., London, GB; An 2005-355258, XP002396922 & WO 2005-030833 A1 (KANEBO LTD) Apr. 7, 2005 abstract.
Shearer, N.H., "T18-Type 1 Polyesters," Mar. 1996, SPE Annual Technical Conference and Exhibition, XP009080224.
Gachter, Muller, "Taschenbuch der Kunststoff-Additive," 1990, Carl Hanser Verlag Munchen Wien, XP02450422, pp. 96-97.
Gachter, Muller, "Kunstoff-Additive," 1990, Carl Hanser Verlag Munchen Wien, XP 02449987, pp. 96-99.
Brown, R., "Taschenbuch Kunstoff-Additive", 1990, Carl Hanswer Verlag Munchen Wiel, XP002455247, pp. 361-363.
Chang, S. et al., "Effect of Stabilizers on the Preparation of Poly(ethylene Terephthalate)", Journal of Polymer Science, Polymer Chemistry Edition, 1982, vol. 20, pp. 2053-2061, John Wiley & Sons, Inc.
USPTO Office Action dated Mar. 11, 2008 for copending U.S. Appl. No. 11/391,642.
USPTO Office Action dated Mar. 24, 2008 for copending U.S. Appl. No. 11/390,908.
USPTO Office Action dated Apr. 15, 2008 for copending U.S. Appl. No. 11/390,629.
USPTO Office Action dated Apr. 16, 2008 for copending U.S. Appl. No. 11/390,751.
USPTO Office Action dated Apr. 17, 2008 for copending U.S. Appl. No. 11/390,814.
USPTO Office Action dated Jun. 3, 2008 for copending U.S. Appl. No. 11/391,063.
USPTO Office Action dated Sep. 10, 2008 for copending U.S. Appl. No. 11/390,752.
USPTO Office Action dated Sep. 10, 2008 for copending U.S. Appl. No. 11/390,794.
USPTO Office Action dated Sep. 19, 2008 for copending U.S. Appl. No. 11/391,565.
USPTO Office Action dated Oct. 2, 2008 for copending U.S. Appl. No. 11/390,671.
USPTO Office Action dated Sep. 24, 2008 for copending U.S. Appl. No. 11/390,631.
USPTO Office Action dated Oct. 1, 2008 for copending U.S. Appl. No. 11/390,655.
USPTO Office Action dated Sep. 29, 2008, for copending U.S. Appl. No. 11/391,137.
USPTO Office Action dated Sep. 9, 2008 for copending U.S. Appl. No. 11/391/571.
USPTO Office Action dated Oct. 22, 2008 for copending U.S. Appl. No. 11/391,125.
USPTO Office Action dated Oct. 20, 2008 for copending U.S. Appl. No. 11/390,672.
USPTO Office Action dated Oct. 8, 2008 for copending U.S. Appl. No. 11/390,853.
USPTO Office Action dated Oct. 9, 2008 for copending U.S. Appl. No. 11/391,505.
USPTO Notice of Allowance dated Oct. 7, 2008 for copending U.S. Appl. No. 11/390,908.
USPTO Office Action dated Oct. 14, 2008 for copending U.S. Appl. No. 11/390,811.
USPTO Office Action dated Oct. 22, 2008 for copending U.S. Appl. No. 11/390,750.
USPTO Office Action dated Oct. 22, 2008 for copending U.S. Appl. No. 11/390,865.
USPTO Office Action dated Oct. 14, 2008 for copending U.S. Appl. No. 11/390,654.
USPTO Office Action dated Oct. 20, 2008 for copending U.S. Appl. No. 11/390,836.
Copending application, U.S. Appl. No. 12/254,894, filed on Oct. 21, 2008, Gary Michael Stack, et al.
USPTO Office Action dated Oct. 29, 2008 for copending U.S. Appl. No. 11/390,955.
USPTO Notice of Allowance dated Nov. 3, 2008 for copending U.S. Appl. No. 11/391,642.
USPTO Office Action dated Nov. 3, 2008 for copending U.S. Appl. No. 11/391,485.
USPTO Office Action dated Oct. 29, 2008 for copending U.S. Appl. No. 11/390,864.
USPTO Office Action dated Oct. 30, 2008 for copending U.S. Appl. No. 11/391,495.
USPTO Office Action dated Oct. 31, 2008 for copending U.S. Appl. No. 11/391,156.

(56) References Cited

OTHER PUBLICATIONS

USPTO Office Action dated Nov. 3, 2008 for copending U.S. Appl. No. 11/390,883.
USPTO Office Action dated Dec. 19, 2008 for copending U.S. Appl. No. 11/390,751.
USPTO Office Action dated Dec. 31, 2008 for copending U.S. Appl. No. 11/390,827.
USPTO Office Action dated Dec. 31, 2008 for copending U.S. Appl. No. 11/390,826.
USPTO Office Action dated Nov. 14, 2008 for copending U.S. Appl. No. 11/390,630.
USPTO Office Action dated Dec. 19, 2008 for copending U.S. Appl. No. 11/391,576.
USPTO Office Action dated Dec. 19, 2008 for copending U.S. Appl. No. 11/390,629.
USPTO Office Action dated Dec. 31, 2008 for copending U.S. Appl. No. 11/390,773.
USPTO Office Action dated Dec. 12, 2008 for copending U.S. Appl. No. 11/391,063.
USPTO Office Action dated Dec. 19, 2008 for copending U.S. Appl. No. 11/390,814.
USPTO Office Action dated Dec. 31, 2008 for copending U.S. Appl. No. 11/390,722.
USPTO Office Action dated Nov. 14, 2008 for copending U.S. Appl. No. 11/390,882.
Copending U.S. Appl. No. 12/361,779, filed Jan. 29, 2009, Emmett Dudley Crawford, et al.
Copending U.S. Appl. No. 12/365,515, filed Feb. 4, 2009, Emmett Dudley Crawford, et al.
USPTO Office Action dated Jan. 29, 2009 for copending U.S. Appl. No. 11/588,524.
USPTO Office Action dated Jan. 30, 2009 for copending U.S. Appl. No. 11/588,458.
USPTO Office Action dated Feb. 2, 2009 for copending U.S. Appl. No. 11/390,853.
Scheirs, John, et al., "Modern Polyesters: Chemistry and Technology of Polyesters and Copolyesters," Technology & Engineering, 2003, p. 287.
USPTO Office Action dated Jan. 21, 2009 for copending U.S. Appl. No. 11/390,847.
USPTO Office Action dated Jan. 12, 2009 for copending U.S. Appl. No. 11/390,858.
USPTO Office Action dated Jan. 26, 2009 for copending U.S. Appl. No. 11/391,659.
USPTO Office Action dated Jan. 26, 2009 for copending U.S. Appl. No. 11/588,554.
USPTO Office Action dated Feb. 3, 2009 for copending U.S. Appl. No. 11/391,505.
USPTO Office Action dated Feb. 10, 2009 for copending U.S. Appl. No. 11/390,865.
USPTO Office Action dated Feb. 12, 2009 for copending U.S. Appl. No. 11/439,062.
USPTO Office Action dated Feb. 13, 2009 for copending U.S. Appl. No. 11/439,340.
USPTO Office Action dated Feb. 25, 2009 for copending U.S. Appl. No. 11/588,907.
USPTO Office Action dated Feb. 25, 2009 for copending U.S. Appl. No. 11/588,527.
USPTO Office Action dated Feb. 27, 2009 for copending U.S. Appl. No. 11/390,955.
USPTO Office Action dated Feb. 25, 2009 for copending U.S. Appl. No. 11/588,906.
USPTO Office Action dated Feb. 25, 2009 for copending U.S. Appl. No. 11/588,883.
USPTO Office Action dated Mar. 5, 2009 for copending U.S. Appl. No. 11/390,864.
USPTO Office Action dated Mar. 6, 2009 for copending U.S. Appl. No. 11/391,156.
USPTO Office Action dated Feb. 25, 2009 for copending U.S. Appl. No. 11/390,811.
USPTO Office Action dated Feb. 27, 2009 for copending U.S. Appl. No. 11/390,654.
USPTO Office Action dated Feb. 27, 2009 for copending U.S. Appl. No. 11/390,836.
USPTO Office Action dated Mar. 13, 2009 for copending U.S. Appl. No. 11/390,883.
USPTO Office Action dated Mar. 11, 2009 for copending U.S. Appl. No. 11/390,630.
USPTO Office Action dated Mar. 9, 2009 for copending U.S. Appl. No. 11/391,495.
USPTO Office Action dated Mar. 9, 2009 for copending U.S. Appl. No. 11/390,750.
Copending U.S. Appl. No. 12/390,694, filed on Feb. 23, 2009, Gary Michael Stack.
USPTO Office Action dated Apr. 17, 2009 for copending U.S. Appl. No. 11/391,565.
USPTO Office Action dated Apr. 15, 2009 for copending U.S. Appl. No. 12/091,566.
USPTO Office Action dated Apr. 17, 2009 for copending U.S. Appl. No. 11/390,671.
USPTO Office Action dated Apr. 20, 2009 for copending U.S. Appl. No. 11/390,631.
USPTO Office Action dated Apr. 27, 2009 for copending U.S. Appl. No. 11/390,655.
USPTO Office Action dated Apr. 27, 2009 for copending U.S. Appl. No. 11/391,137.
USPTO Office Action dated Apr. 16, 2009 for copending U.S. Appl. No. 12/091,570.
USPTO Office Action dated Apr. 2, 2009 for copending U.S. Appl. No. 11/390,793.
USPTO Office Action dated Mar. 31, 2009 for copending U.S. Appl. No. 11/390,563.
USPTO Notice of Allowance dated Apr. 13, 2009 for copending U.S. Appl. No. 11/391,063.
USPTO Office Action dated Mar. 16, 2009 for copending U.S. Appl. No. 11/391,485.
USPTO Office Action dated Mar. 16, 2009 for copending U.S. Appl. No. 11/390,882.
USPTO Office Action dated Mar. 23, 2009 for copending U.S. Appl. No. 11/390,794.
USPTO Office Action dated Mar. 23, 2009 for copending U.S. Appl. No. 11/390,752.
USPTO Office Action dated May 13, 2009 for copending U.S. Appl. No. 12/361,779.
USPTO Office Action dated May 13, 2009 for copending U.S. Appl. No. 12/365,515.
USPTO Office Action dated May 21, 2009 for copending U.S. Appl. No. 11/706,476.
USPTO Office Action dated May 22, 2009 for copending U.S. Appl. No. 11/706,791.
USPTO Office Action dated May 18, 2009 for copending U.S. Appl. No. 11/391,505.
USPTO Office Action dated Apr. 14, 2009 for copending U.S. Appl. No. 11/635,434.
USPTO Office Action dated Apr. 14, 2009 for copending U.S. Appl. No. 11/635,433.
USPTO Office Action dated May 18, 2009 for copending U.S. Appl. No. 11/390,846.
New Copending U.S. Appl. No. 12/479,893, filed Jun. 8, 2009, Emmett Dudley Crawford, et al.
USPTO Office Action dated Jun. 11, 2009 for copending U.S. Appl. No. 11/390,809.
USPTO Office Action dated Jul. 2, 2009 for copending U.S. Appl. No. 11/390,827.
Shearer, N.H., "T18-Type 1 Polyesters, " Mar. 1966, SPE Annual Technical Conference and Exhibition, XP009080224 (correcting date of reference; previously cited in IDS submitted on Feb. 4, 2009).
USPTO Office Action dated Aug. 7, 2009 for copending U.S. Appl. No. 11/390,773.
USPTO Office Action dated Aug. 10, 2009 for copending U.S. Appl. No. 11/390,722.
USPTO Office Action dated Aug. 27, 2009 for copending U.S. Appl. No. 11/390,826.

(56) References Cited

OTHER PUBLICATIONS

Dixon, et al.; "The Inter-Relation of Some Mechanical Properties with Molecular Weight and Crystallinity in Poly (ethylene terephthalate)"; Journal of Materials Science 3 (1968) 464-470.
USPTO Office Action dated Sep. 14, 2009 for copending U.S. Appl. No. 11/391,576.
USPTO Office Action dated Sep. 24, 2009 for copending U.S. Appl. No. 11/588,883.
USPTO Office Action dated Sep. 24, 2009 for copending U.S. Appl. No. 11/390,858.
USPTO Office Action dated Sep. 28, 2009 for copending U.S. Appl. No. 11/390,847.
USPTO Office Action dated Sep. 29, 2009 for copending U.S. Appl. No. 11/390,629.
USPTO Office Action dated Sep. 29, 2009 for copending U.S. Appl. No. 11/390,751.
Buschow, K.H.J. et al., "Packaging: Polymers for Containers," Encyclopedia of Materials: Science and Technology, 2001, vol. 8, pp. 6646-6652, El Sevier.
USPTO Office Action dated Sep. 29, 2009 for copending U.S. Appl. No. 11/390,814.
Coles, Richard, et al., Food Packaging Technology, 2003, pp. 194-195 and 224-229, Blackwell Publishing.
Sajiki and Yonekubo, "Leaching of Bisphenol A (BPA) to Seawater from Polycarbonate Plastic and its Degradation by Reactive Oxygen Species," 2003, Chemosphere, 51, pp. 55-62.
Ellis, Thomas S., "Miscibility of Polyamide Blends: Effects of Configuration," POLYMER, vol. 36, Issue 20, 1995, pp. 3919-3926.
USPTO Office Action dated Oct. 2, 2009 for copending U.S. Appl. No. 11/588,524.
USPTO Office Action dated Oct. 7, 2009 for copending U.S. Appl. No. 11/588,458.
USPTO Office Action dated Oct. 19, 2009 for copending U.S. Appl. No. 11/390,563.
USPTO Office Action dated Oct. 20, 2009 for copending U.S. Appl. No. 11/588,907.
USPTO Office Action dated Oct. 21, 2009 for copending U.S. Appl. No. 11/391,156.
Gupta, V.B. et al., "PET Fibers, Films, and Bottles: Section 5-7", Handbook of Thermoplastic Polyesters: Homopolymers, Copolymers, Blends, and Composites, 2005, pp. 362-388, Wiley InterScience.
USPTO Office Action dated Oct. 22, 2009 for copending U.S. Appl. No. 11/588,906.
USPTO Office Action dated Nov. 3, 2009 for copending U.S. Appl. No. 11/390,883.
USPTO Office Action dated Nov. 4, 2009 for copending U.S. Appl. No. 11/390,750.
USPTO Office Action dated Nov. 4, 2009 for copending U.S. Appl. No. 11/390,864.
USPTO Office Action dated Nov. 17, 2009 for copending U.S. Appl. No. 12/254,894.
USPTO Office Action dated Nov. 18, 2009 for copending U.S. Appl. No. 11/390,794.
USPTO Office Action dated Nov. 20, 2009 for copending U.S. Appl. No. 11/390,882.
USPTO Office Action dated Nov. 20, 2009 for copending U.S. Appl. No. 11/391,485.
USPTO Office Action dated Nov. 18, 2009 for copending U.S. Appl. No. 11/390,630.
USPTO Office Action dated Nov. 30, 2009 for copending U.S. Appl. No. 11/391,495.
Turner, S.R., et al., "Amorphous and Crystalline Polyesters based on 1,4-Cyclohexanedimethanol", Chapter 7, Modern Polyesters: Chemistry and Technology of Polyesters and Copolyesters, Edited by J. Sheirs and T.E. Long, 2003 John Wiley & Sons, Ltd., pp. 267-292.
Zipper, Marcus D. et al., "A Free Volume Study of Miscible Polyester Blends," 1995, Polymer International, vol. 36, pp. 127-136.
USPTO Office Action dated Dec. 1, 2009 for copending U.S. Appl. No. 12/091,570.
USPTO Office Action dated Dec. 3, 2009 for copending U.S. Appl. No. 11/395,505.
USPTO Office action dated Dec. 4, 2009 for copending U.S. Appl. No. 12/091,566.
USPTO Office Action dated Sep. 1, 2009 for copending U.S. Appl. No. 11/391,124.
"APEC High-Heat Polycarbonate Resin," 2004, Bayer Material Science Product Information; Not Prior Art, Submitted for State of the Art.
Lobo, Hubert et al, "Handbook of Plastics Analysis," 2003, pp. 20 and 21, Marcel Dekker, Inc.
USPTO Office Action dated Sep. 10, 2009 for copending U.S. Appl. No. 11/390,812.
USPTO Notice of Allowance dated Dec. 11, 2009 for copending U.S. Appl. No. 12/365,515.
USPTO Office Action dated Dec. 18, 2009 for copending U.S. Appl. No. 11/390,846.
Copending U.S. Appl. No. 12/639,324, filed on Dec. 16, 2009.
USPTO Notice of Allowance dated Dec. 22, 2009 for copending U.S. Appl. No. 12/361,779.
USPTO Office Action dated Jan. 7, 2010 for copending U.S. Appl. No. 12/091,568.
USPTO Office Action dated Jan. 13, 2010 for copending U.S. Appl. No. 11/635,433.
USPTO Office Action dated Jan. 14, 2010 for copending U.S. Appl. No. 11/390,809.
USPTO Notice of Allowance dated Jan. 27, 2010 for copending U.S. Appl. No. 11/635,434.
USPTO Office Action dated Mar. 11, 2010, for copending U.S. Appl. No. 11/391,124.
Copending U.S. Appl. No. 12/724,492, filed on Mar. 16, 2010.
Copending U.S. Appl. No. 12/724,480, filed on Mar. 16, 2010.
Copending U.S. Appl. No. 12/724,468, filed on Mar. 16, 2010.
USPTO Office Action dated Mar. 19, 2010, for copending U.S. Appl. No. 11/588,527.
USPTO Notice of Allowance dated Mar. 24, 2010 for copending U.S. Appl. No. 11/391,565.
USPTO Office Action dated Mar. 29, 2010 for copending U.S. Appl. No. 11/390,812.
USPTO Notice of Allowance dated Apr. 15, 2010 for copending U.S. Appl. No. 11/391,505.
USPTO Office Action dated Apr. 19, 2010 for copending U.S. Appl. No. 12/724,480.
USPTO Office Action dated Apr. 21, 2010 for copending U.S. Appl. No. 12/724,468.
USPTO Office Action dated Apr. 21, 2010 for copending U.S. Appl. No. 12/724,492.
USPTO Office Action dated May 6, 2010 for copending U.S. Appl. No. 12/254,894.
New copending U.S. Appl. No. 12/784,193, filed on May 20, 2010, Emmett Dudley Crawford, et al.
USPTO Notice of Allowance dated May 13, 2010 for copending U.S. Appl. No. 11/390,629.
USPTO Notice of Allowance dated May 13, 2010 for copending U.S. Appl. No. 11/390,751.
USPTO Notice of Allowance dated May 21, 2010 for copending U.S. Appl. No. 11/391,156.
USPTO Notice of Allowance dated May 26, 2010 for copending U.S. Appl. No. 11/391,495.
USPTO Notice of Allowance dated Jun. 24, 2010 for copending U.S. Appl. No. 11/391,576.
USPTO Office Action dated Jun. 24, 2010 for copending U.S. Appl. No. 11/390,846.
USPTO Office Action dated Jul. 8, 2010 for copending U.S. Appl. No. 11/390,809.
USPTO Notice of Allowance dated Jul. 8, 2010 for copending U.S. Appl. No. 11/390,630.
USPTO Notice of Allowance dated Jul. 8, 2010 for copending U.S. Appl. No. 11/390,883.
USPTO Office Action dated Jul. 12, 2010 for copending U.S. Appl. No. 11/390,794.
Notice of Allowance dated Jul. 13, 2010 for copending U.S. Appl. 11/391,505.

(56) References Cited

OTHER PUBLICATIONS

USPTO Office Action dated Jul. 22, 2010 for copending U.S. Appl. No. 12/479,893.
USPTO Notice of Allowance dated Jul. 22, 2010 for copending U.S. Appl. No. 11/391,485.
USPTO Notice of Allowance dated Aug. 3, 2010 for copending U.S. Appl. No. 11/390,864.
USPTO Office Action dated Aug. 6, 2010 for copending U.S. Appl. No. 11/773,275.
New copending U.S. Appl. No. 12/853,717, filed on Aug. 10, 2010, Emmett Dudley Crawford, et al.
USPTO Notice of Allowance dated Aug. 11, 2010 for copending U.S. Appl. No. 11/390,631.
USPTO Notice of Allowance dated Sep. 2, 2010 for copending U.S. Appl. No. 11/390,811.
USPTO Office Action dated Sep. 2, 2010 for copending U.S. Appl. No. 11/391,124.
New copending U.S. Appl. No. 12/888,648, filed on Sep. 23, 2010, Thomas Joseph Pecorini et al.
USPTO Office Action dated Oct. 5, 2010 for copending U.S. Appl. No. 11/390,655.
New copending U.S. Appl. No. 12/900,060, filed on Oct. 7, 2010, Thomas Joseph Pecorini, et al.
USPTO Office Action dated Oct. 8, 2010 for copending U.S. Appl. No. 11/390,812.
USPTO Notice of Allowance dated Oct. 28, 2010 for copending U.S. Appl. No. 11/390,827.
USPTO Office Action dated Oct. 27, 2010 for copending U.S. Appl. No. 12/294,690.
New Copending U.S. Appl. No. 12/900,060, filed on Oct. 7, 2010, Joseph Thomas Pecorini.
USPTO Notice of Allowance dated Oct. 14, 2010 for copending U.S. Appl. No. 11/390,722.
USPTO Notice of Allowance dated Nov. 2, 2010 for copending U.S. Appl. No. 12/724,480.
USPTO Notice of Allowance dated Nov. 4, 2010 for copending U.S. Appl. No. 12/724,468.
USPTO Notice of Allowance dated Nov. 4, 2010 for copending U.S. Appl. No. 11/390,955.
USPTO Office Action dated Nov. 4, 2010 for copending U.S. Appl. No. 12/294,686.
USPTO Notice of Allowance dated Nov. 4, 2010 for copending U.S. Appl. No. 11/390,826.
USPTO Office Action dated Oct. 27, 2010 for copending U.S. Appl. No. 11/390,836.
USPTO Notice of Allowance dated Nov. 23, 2010 for copending U.S. Appl. No. 11/390,563.
New copending U.S. Appl. No. 12/943,217, filed on Nov. 10, 2010, Emmett Dudley Crawford et al.
New copending U.S. Appl. No. 12/963,703, filed on Dec. 9, 2010.
New copending U.S. Appl. No. 12/963,698, filed on Dec. 9, 2010.
New copending U.S. Appl. No. 13/007,838, filed on Jan. 17, 2011, Emmett Dudley Crawford et al.
USTPO Office Action dated Jan. 24, 2011 for copending U.S. Appl. No. 11/773,275.
New copending U.S. Appl. No. 13/016,147, filed on Jan. 28, 2011, Emmett Dudley Crawford, et al.
New copending U.S. Appl. No. 13/017,069, filed on Jan. 31, 2011, Emmett Dudley Crawford, et al.
New Copending U.S. Appl. No. 13/017,352, filed on Jan. 31, 2011, Emmett Dudley Crawford, et al.
USPTO Office Action dated Jan. 25, 2011 for copending U.S. Appl. No. 12/853,717.
Al-Malaika, S., "Stabilization", Encyclopedia of Polymer Science and Technology, vol. 4, 2001, pp. 179-229, John Wiley & Sons, Inc.
USPTO Notice of Allowance dated Jan. 26, 2011 for copending U.S. Appl. No. 11/390,858.
USPTO Office Action dated Feb. 2, 2011 for copending U.S. Appl. No. 11/390,655.
USPTO Office Action dated Mar. 17, 2011 for copending U.S. Appl. No. 12/479,893.
USPTO Notice of Allowance dated Mar. 17, 2011 for copending U.S. Appl. No. 11/391,137.
USPTO Office Action dated Feb. 14, 2011 for copending U.S. Appl. No. 12/294,690.
USPTO Notice of Allowance dated Feb. 18, 2011 for copending U.S. Appl. No. 11/390,809.
USPTO Notice of Allowance dated Feb. 17, 2011 for copending U.S. Appl. No. 11/390,812.
USPTO Office Action dated Jun. 16, 2011 for copending U.S. Appl. No. 12/390,694.
USPTO Notice of Allowance dated Aug. 12, 2011 for copending U.S. Appl. No. 11/390,752.
USPTO Office Action dated Jul. 19, 2011 for copending U.S. Appl. No. 11/390,794.
USPTO Notice of Allowance dated Jul. 21, 2011 for copending U.S. Appl. No. 11/390,671.
USPTO Notice of Allowance dated Aug. 3, 2011 for copending U.S. Appl. No. 11/390,655.
New copending U.S. Appl. No. 13/162,870, filed on Jun. 17, 2011, Emmett Dudley Crawford, et al.
USPTO Office Action dated Jul. 7, 2011 for copending U.S. Appl. No. 11/588,906.
USPTO Office Action dated Jun. 22, 2011 for copending U.S. Appl. No. 12/091,570.
USPTO Office Action dated Jun. 8, 2011 for copending U.S. Appl. No. 11/588,883.
USPTO Office Action dated Aug. 17, 2011 for copending U.S. Appl. No. 12/274,692.
New copending U.S. Appl. No. 13/215,511, filed on Aug. 23, 2011, Emmett Dudley Crawford, et al.
USPTO Office Action dated Sep. 14, 2011 for copending U.S. Appl. No. 13/017,069.
USPTO Notice of Allowance dated Sep. 16, 2011 for copending U.S. Appl. No. 11/390,671.
USPTO Notice of Allowance dated Sep. 16, 2011 for copending U.S. Appl. No. 12/784,193.
USPTO Office Action dated Oct. 17, 2011 for copending U.S. Appl. No. 12/853,717.
USPTO Notice of Allowance dated Oct. 17, 2011 for copending U.S. Appl. No. 11/390,794.
USPTO Notice of Allowance dated Oct. 25, 2011 for copending U.S. Appl. No. 12/900,060.
USTPO Office Action dated Oct. 31, 2011 for copending U.S. Appl. No. 12/639,324.
USPTO Office Action dated Nov. 2, 2011 for copending U.S. Appl. No. 12/479,893.
USPTO Notice of Allowance dated Nov. 2, 2011 for copending U.S. Appl. No. 12/390,694.
USPTO Notice of Allowance dated Nov. 10, 2011 for copending U.S. Appl. No. 12/943,217.
USPTO Notice of Allowance dated Dec. 16, 2011 for copending U.S. Appl. No. 12/390,694.
USPTO Notice of Allowance dated Nov. 28, 2011 for copending U.S. Appl. No. 12/274,692.
USPTO Office Action dated Dec. 21, 2011 for copending U.S. Appl. No. 12/091,570.

* cited by examiner

POLYESTER COMPOSITIONS WHICH COMPRISE SPIRO-GLYCOL, CYCLOHEXANEDIMETHANOL, AND TEREPHTHALIC ACID

FIELD OF THE INVENTION

The present invention generally relates to polyester compositions made from terephthalic acid, or an ester thereof, and mixtures thereof, spiro-glycol ("SPG"), as described herein, and cyclohexanedimethanol, or chemical equivalents that have certain combinations of two or more of better processability, good color, molecular weight distribution less than 2.5 or less than or equal to 2 during polyester synthesis in the melt, $T_g$s greater than 95° C., articles made therefrom, and processes of making these polyester compositions.

BACKGROUND OF THE INVENTION

PET (polyethylene terephthalate) is an industrially valuable polyester because of its excellent mechanical properties and relatively low cost. For example, PET has been widely used in various applications such as fibers, tire cords, bottles and films. However, when PET is formed or injection molded into thick parts, its high crystallization rate is likely to cause whitening in the parts due to crystallization in the fabrication step. To avoid this disadvantage, PET can be modified with a comonomer to reduce the crystallization rate. Examples of comonomers used to modify PET are isophthalic acid and 1,4-cyclohexanedimethanol (CHDM). These modified PET resins are commercially available.

However, these CHDM modified PET resins have $T_g$s less than 95° C., and therefore, their use in applications requiring a high heat resistance, for example, injection molded cups and bowls to be placed in a dishwasher; or a sign for outdoor use in hot climates, is limited.

The crystallization rate for PET can be modified by a variety of comonomers. SPG is effective at increasing the $T_g$ when used as comonomer for PET. However, for PET modified by SPG, U.S. Pat. No. 6,447,859 indicates that the molecular weight distribution can be regulated within the range of 2.5 to 12.0 by appropriately selecting the addition amount and addition timing of SPG, the molecular weight of the polyester, the polymerization temperature, and additives. In other words, the degree of branching, as indicated by the molecular weight distribution, formed in these polyesters is controlled by a reaction conditions. As a result, it can be difficult to control the degree of branching and therefore the melt viscosity profile consistently during the production of SPG modified PET due to changes in process conditions. It is more desirable to control branching by using a branching agent that is added to a polyester and not formed in-situ. In this case, the degree of branching or molecular weight distribution would be directly proportional to the amount of branching agent added and not heavily influenced by reaction conditions as in the case when reactions take place with SPG to form branching agents.

PCT (polycyclohexylene-dimethylene-terephthalate) is also industrially valuable polyester because of its superiority in mechanical properties. For example, PCT has been widely used in various applications such as fibers and melt-blown fabrics. However, like PET when PCT is formed or injection molded into thick parts, its high crystallization rate will cause whitening in the part due to crystallization in the fabrication step. To avoid this disadvantage, like PET, PCT can be modified with a comonomer to reduce the crystallization rate. Examples of comonomers used to modify PCT are isophthalic acid and ethylene glycol. These ethylene glycol or isophthalic acid modified PCTs are known in the art and are commercially available. However, these modified PCTs have $T_g$s less than 95° C., so their use in applications requiring a high heat resistance, for example, injection molded cups and bowls placed in a dishwasher or outdoor signs in hot climates, is limited.

There is a need in the art for reducing the crystallization rate of PCT while increasing the $T_g$ above 95° C.

Further, in one embodiment, there is a need in the art for polyesters having better processability, good color, molecular weight distribution of less than 2.5 or less than or equal to 2 or less during polyester synthesis in the melt (, $T_g$s greater than 95° C., articles made therefrom; and processes of making these polyester compositions.

SUMMARY OF THE INVENTION

It is believed that the polyester compositions of the invention, formed from terephthalic acid, an ester thereof, and/or mixtures thereof, SPG and cyclohexanedimethanol, are superior to certain existing commercial polymers with respect to having a $T_g$ greater than 95° C., good color, and good clarity. In one embodiment, the polyesters useful in the invention can have molecular weight distributions less than 2.5, or less than or equal to 2 occurring during polyester synthesis in the melt; the invention further includes articles made therefrom; and, in other embodiments, the invention includes processes of making these SPG modified PCT compositions wherein there is a $T_g$ greater than 95° C., a reduction in crystallization rate of PCT, and little to no branching occurring during polymer synthesis in the melt as indicated by a molecular weight distribution of around 2 or less than 2.

In one aspect, the invention relates to a polyester composition comprising at least one polyester which comprises:
(a) a dicarboxylic acid component comprising:
   (i) about 80 to about 100 mole % of terephthalic acid residues;
   (ii) about 0 to about 20 mole % of aromatic and/or aliphatic dicarboxylic acid residues having up to 20 carbon atoms; and
(b) a glycol component comprising:
   (i) about 1 to about 49 mole % spiro-glycol residues; and
   (ii) about 51 to about 99 mole % of at least one glycol chosen from at least one of 1,4-cyclohexanedimethanol residues and 2,2,4,4-tetramethyl-1,3-cyclobutanediol residues;
wherein the total mole % of the dicarboxylic acid component is 100 mole %, and wherein the total mole % of the glycol component is 100 mole %.

In one aspect, this invention relates to a polyester composition comprising at least one polyester which comprises:
(a) a dicarboxylic acid component comprising:
   (i) about 80 to about 100 mole % of terephthalic acid residues;
   (ii) about 0 to about 20 mole % of aromatic and/or aliphatic dicarboxylic acid residues having up to 20 carbon atoms; and
(b) a glycol component comprising:
   (i) about 1 to about 49 mole % spiro-glycol residues; and
   (ii) about 51 to about 99 mole % of at least one glycol consisting essentially of at least one of 1,4-cyclohexanedimethanol residues and 2,2,4,4-tetramethyl-1,3-cyclobutanediol residues;
wherein the total mole % of the dicarboxylic acid component is 100 mole %, and wherein the total mole % of the glycol component is 100 mole %.

In one aspect, this invention relates to a process for preparing a polyester comprising the steps of:
(I) heating a mixture comprising the monomers useful in any of the polyesters useful in the invention in the presence of a catalyst at a temperature of 150 to 240° C. for a time sufficient to produce an initial polyester, wherein said mixture comprises:
(a) a dicarboxylic acid component comprising:
(i) about 80 to about 100 mole % of terephthalic acid residues;
(ii) about 0 to about 20 mole % of aromatic and/or aliphatic dicarboxylic acid residues having up to 20 carbon atoms; and
(b) a glycol component comprising:
(i) about 1 to about 49 mole % spiro-glycol residues residues; and
(ii) about 51 to about 99 mole % of at least one glycol chosen from at least one of 1,4-cyclohexanedimethanol residues and 2,2,4,4-tetramethyl-1,3-cyclobutanediol residues;
wherein the total mole % of the dicarboxylic acid component is 100 mole %, and wherein the total mole % of the glycol component is 100 mole %;
(II) heating the initial polyester of step (I) at a temperature of 240 to 320° C. for 1 to 4 hours; and
(III) removing any unreacted glycols;
wherein during said process, the molecular weight distributions of the polyester are less than 2.5 or less than or equal to 2.

In one aspect, the spiro-glycol is present in the amount of about 20 to about 45 mole %.

In one aspect, the spiro-glycol is present in the amount of about 20 to about 40 mole %

In one aspect, the spiro-glycol is present in the amount of about 25 to about 40 mole %.

In one aspect, the inherent viscosity of the polyester is from 0.5 to 1 dL/g.

In one aspect, the inherent viscosity of the polyester is from 0.60 to 0.75 dL/g.

In one aspect, the polyester composition of Claim 1 wherein the polyester does not contain ethylene glycol.

In one aspect, the polyester has a $T_g$ of 95° C. to 140° C.

In one aspect, the polyester has a Tg of 95° C. to 120° C.

In one aspect, the polyester comprises at least one modifying glycol chosen from diethylene glycol, 1,2-propanediol, neopentyl glycol, polytetramethylene glycol, 1,5-pentanediol, 1,6-hexanediol, p-xylene glycol, 1,3-propanediol and 1,4-butanediol or mixtures thereof.

In one aspect, the polyester comprises 2,2,4,4-tetramethyl-1,3-cyclobutanediol residues wherein the residues are a mixture comprising 30 to 70 mole % of cis-2,2,4,4-tetramethyl-1,3-cyclobutanediol residues and 30 to 70 mole % of trans-2,2,4,4-tetramethyl-1,3-cyclobutanediol residues.

In one aspect, the polyester comprises 2,2,4,4-tetramethyl-1,3-cyclobutanediol residues wherein the residues are a mixture comprising 40 to 60 mole % of cis-2,2,4,4-tetramethyl-1,3-cyclobutanediol residues and 40 to 60 mole % of trans-2,2,4,4-tetramethyl-1,3-cyclobutanediol residues.

In one aspect, the polyester composition of the invention comprises at least one polymer of poly(etherimides), polyphenylene oxides, poly(phenylene oxide)/polystyrene blends, polystyrene resins, polyphenylene sulfides, polyphenylene sulfide/sulfones, poly(ester-carbonates), polycarbonates, polysulfones; polysulfone ethers, poly(ether-ketones), polyesters other than those of those of the invention, and mixtures thereof.

In one aspect, the polyester composition of the invention comprises at least one additive chosen from colorants, mold release agents, phosphorus compounds other than those described in the invention, plasticizers, nucleating agents, UV stabilizers, glass fiber, carbon fiber, fillers, impact modifiers, or a mixture thereof.

In one aspect, the b* color values for the polyesters useful in the invention is from −12 to less than 12 as determined by the L*a*b* color system.

In one aspect, the polyester compositions are useful in articles of manufacture including, but not limited to, extruded, calendered, and/or molded articles including, but not limited to, injection molded articles, extruded articles, cast extrusion articles, profile extrusion articles, melt spun articles, thermoformed articles, extrusion molded articles, injection blow molded articles, injection stretch blow molded articles, extrusion blow molded articles and extrusion stretch blow molded articles. These articles can include, but are not limited to, films, bottles, containers, sheet and/or fibers.

In one aspect, the polyester compositions useful in the invention may be used in various types of film and/or sheet, including but not limited to extruded film(s) and/or sheet(s), calendered film(s) and/or sheet(s), compression molded film(s) and/or sheet(s), solution casted film(s) and/or sheet(s). Methods of making film and/or sheet include but are not limited to extrusion, calendering, compression molding, and solution casting.

In one aspect, the invention is related to thermoformed film(s) and/or sheet(s) comprising the polyester(s) and/or polyester compositions of the invention.

In one aspect, the invention is related to articles of manufacture which incorporate the thermoformed film and/or sheet of the invention. In one aspect, the invention is related to molded articles which incorporate the polyester composition(s) of the invention. In one aspect, the invention is related to pellets which incorporate the polyester composition(s) of the invention.

DETAILED DESCRIPTION OF THE INVENTION

The present invention may be understood more readily by reference to the following detailed description of certain embodiments of the invention and the working examples. In accordance with the purpose(s) of this invention, certain embodiments of the invention are described in the Summary of the Invention and are further described herein below. Also, other embodiments of the invention are described herein.

It is believed that certain polyesters and/or polyester composition(s) of the invention formed from terephthalic acid, an ester thereof, and/or mixtures thereof, SPG and 1,4-cyclohexanedimethanol, and, optionally, 2,2,4,4-tetramethyl-1,3-cyclobutanediol, and/or mixtures thereof, can have a unique combination of two or more of the following properties: high notched Izod impact strengths, good heat resistance, certain inherent viscosities, certain glass transition temperature ($T_g$); certain flexural modulus, good clarity, good melt viscosity, good processability, long crystallization half-time, and good color.

U.S. Pat. No. 2,945,008 describes polyesters containing 3,9-bis(1,1-dimethyl-2-hydroxyethyl)-2,4,8,10-tetraoxaspiro[5.5]undecane (hereinafter referred to as "SPG") represented by Formula I:

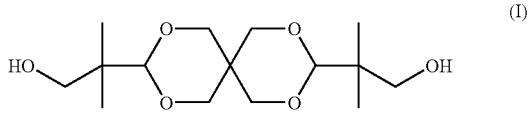 [SMILES: CC(C)(CO)C1OCC2(CO1)COC(C(C)(C)CO)OC2]
(I)

The spiro-glycol employed in accordance with this invention and certain other related spiro-glycols can be prepared by various processes. An especially advantageous process comprises treating hydroxypivaldehyde with pentaerythritol. The reaction of hydroxypivaldehyde with pentaerythritol is represented by the equation (II):

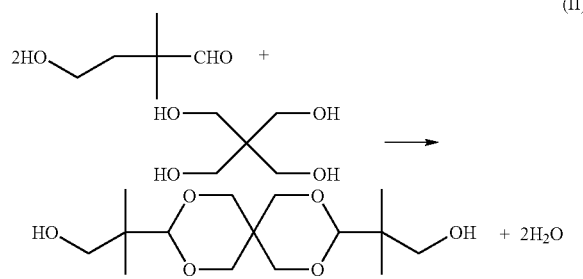
(II)

This reaction is a special case of the reaction of hydroxypivaldehyde with various 2-hydroxymethyl-1,3-propanediols which can be represented by the equation (III):

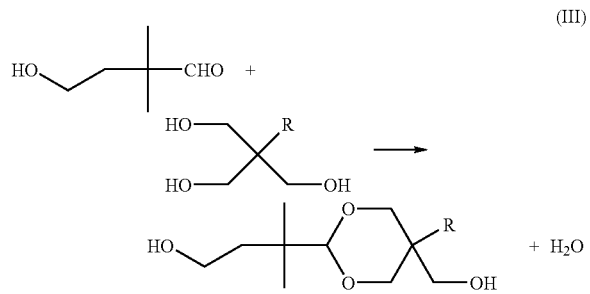
(III)

in which R represents a hydrogen atom or an alkyl radical. Hydroxypivaldehyde is readily prepared by known methods from isobutyraldehyde and formaldehyde. The polyhydroxy compounds are readily prepared by known methods from formaldehyde and acetaldehyde or an appropriate aldehyde. The preparation of such compounds was first described in U.S. Pat. No. 2,945,008.

One possible route, shown as equation IV, for the formation of a branching agent (pentaerythritrol) is the hydrolysis of SPG back to pentaerythritrol and hydroxypivaldehyde.

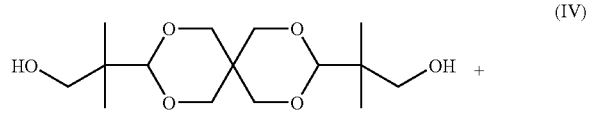
(IV)

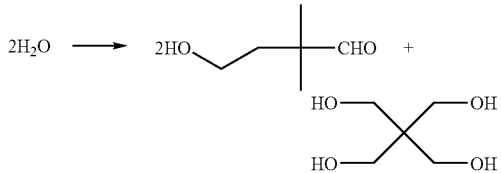

Other routes, equations V, VI, and VII, for the formation of branching agents are reactions between a glycol, such as ethylene glycol, and SPG. All the products in equations V-VII have 3 or more hydroxyls on the molecule and will therefore act as a branching agent. Other variants of these reactions exist resulting in the formation of branching agents.

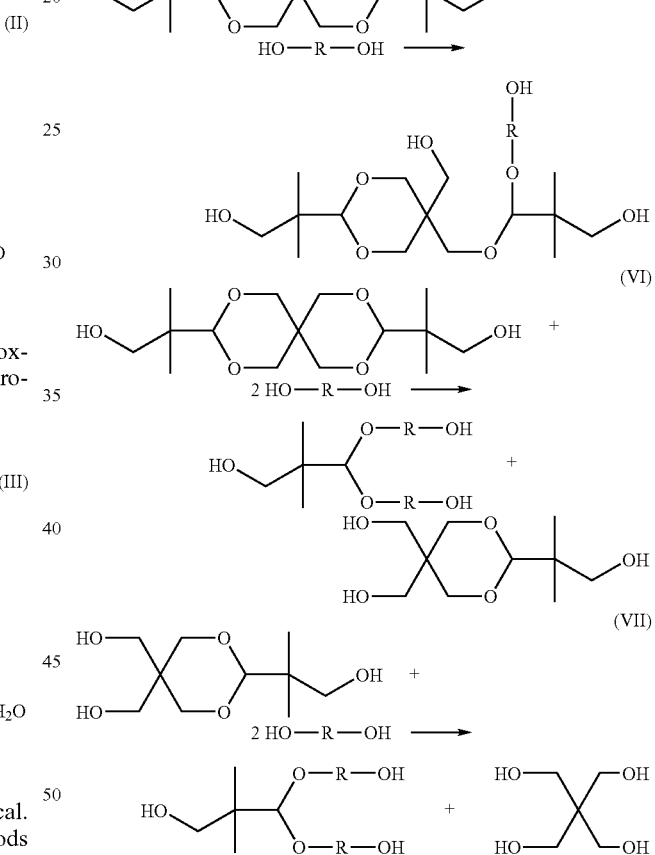

In one embodiment, these polyesters useful in the invention can have a molecular weight distribution less than 2.5 or equal to or less than 2 occurring during polyester synthesis in the melt; the invention further includes articles made therefrom; and, in other embodiments, the invention includes processes of making these PCT polyester compositions modified by SPG wherein there is improved heat resistance, a reduction in crystallization rate compared to PCT, and little to no branching occurring during polymer synthesis in the melt as indicated by a molecular weight distribution of less than 2.5 or equal to or less than 2.

In one embodiment, the processes of making the polyesters useful in the invention can comprise a batch or continuous process.

In one embodiment, the processes of making the polyesters useful in the invention continuous process.

In one embodiment, the term "consisting essentially of" means that the polyesters useful in the invention can contain modifying glycols (not SPG or CHDM), only to the extent that the properties of the polyester are not significantly changed compared to a polyester of the invention which contains only SPG or CHDM.

The term "polyester", as used herein, is intended to include "copolyesters" and is understood to mean a synthetic polymer prepared by the reaction of one or more difunctional carboxylic acids and/or multifunctional carboxylic acids with one or more difunctional hydroxyl compounds and/or multifunctional hydroxyl compounds, for example, branching agents. Typically the difunctional carboxylic acid can be a dicarboxylic acid and the difunctional hydroxyl compound can be a dihydric alcohol such as, for example, glycols and diols. The term "glycol" as used herein includes, but is not limited to, diols, glycols, and/or multifunctional hydroxyl compounds, for example, branching agents. Alternatively, the difunctional carboxylic acid may be a hydroxy carboxylic acid such as, for example, p-hydroxybenzoic acid, and the difunctional hydroxyl compound may be an aromatic nucleus bearing 2 hydroxyl substituents such as, for example, hydroquinone. The term "residue", as used herein, means any organic structure incorporated into a polymer through a polycondensation and/or an esterification reaction from the corresponding monomer. The term "repeating unit", as used herein, means an organic structure having a dicarboxylic acid residue and a diol residue bonded through a carbonyloxy group. Thus, for example, the dicarboxylic acid residues may be derived from a dicarboxylic acid monomer or its associated acid halides, esters, salts, anhydrides, and/or mixtures thereof. Furthermore, as used herein, the term "diacid" includes multifunctional acids, for example, branching agents. As used herein, therefore, the term "dicarboxylic acid" is intended to include dicarboxylic acids and any derivative of a dicarboxylic acid, including its associated acid halides, esters, half-esters, salts, half-salts, anhydrides, mixed anhydrides, and/or mixtures thereof, useful in a reaction process with a diol to make polyester. As used herein, the term "terephthalic acid" is intended to include terephthalic acid itself and residues thereof as well as any derivative of terephthalic acid, including its associated acid halides, esters, half-esters, salts, half-salts, anhydrides, mixed anhydrides, and/or mixtures thereof or residues thereof useful in a reaction process with a diol to make polyester.

The polyesters used in the present invention typically can be prepared from dicarboxylic acids and diols which react in substantially equal proportions and are incorporated into the polyester polymer as their corresponding residues. The polyesters of the present invention, therefore, can contain substantially equal molar proportions of acid residues (100 mole %) and diol (and/or multifunctional hydroxyl compound) residues (100 mole %) such that the total moles of repeating units is equal to 100 mole %. The mole percentages provided in the present disclosure, therefore, may be based on the total moles of acid residues, the total moles of diol residues, or the total moles of repeating units. For example, a polyester containing 10 mole % isophthalic acid, based on the total acid residues, means the polyester contains 10 mole % isophthalic acid residues out of a total of 100 mole % acid residues. Thus, there are 10 moles of isophthalic acid residues among every 100 moles of acid residues. In another example, a polyester containing 30 mole % SPG, based on the total diol residues, means the polyester contains 30 mole % SPG residues out of a total of 100 mole % diol residues. Thus, there are 30 moles of SPG residues among every 100 moles of diol residues.

In other aspects of the invention, the $T_g$ of the polyesters useful in the polyester compositions of the invention can be at least one of the following ranges: 95 to 150° C.; 95 to 145° C.; 95 to 140° C.; 95 to 135° C.; 95 to 130° C.; 95 to 125° C.; 95 to 120° C.; 95 to 115° C.; 95 to 110° C.; 95 to 105° C.; 95 to 100° C.; 100 to 150° C.; 100 to 145° C.; 100 to 140° C.; 100 to 135° C.; 100 to 130° C.; 100 to 125° C.; 100 to 120° C.; 100 to 115° C.; 100 to 110° C.; 105 to 150° C.; 105 to 145° C.; 105 to 140° C.; 105 to 135° C.; 105 to 130° C.; 105 to 125° C.; 105 to 120° C.; 105 to 115° C.; 105 to 110° C.; 110 to 150° C.; 110 to 145° C.; 110 to 140° C.; 110 to 135° C.; 110 to 130° C.; 110 to 125° C.; 110 to 120° C.; 110 to 115° C.; 115 to 150° C.; 115 to 145° C.; 115 to 140° C.; 115 to 135° C.; 115 to 130° C.; 115 to 125° C.; 115 to 120° C.; 120 to 150° C.; 120 to 145° C.; 120 to 140° C.; 120 to 135° C.; 120 to 130° C.; 125 to 150° C.; 125 to 145° C.; 125 to 140° C.; 125 to 135° C.; 130 to 150° C.; 130 to 145° C.; 130 to 140° C.; 130 to 135° C.; 135 to 150° C.; 135 to 145° C.; and 135 to 140° C.

In other aspects of the invention, the glycol component for the polyesters useful in the invention include but are not limited to at least one of the following combinations of ranges: 1 to 49 mole % SPG and 51 to 99 mole % 1,4-cyclohexanedimethanol; 1 to 45 mole % SPG and 55 to 99 mole % 1,4-cyclohexanedimethanol; 1 to 40 mole % SPG and 60 to 99 mole % 1,4-cyclohexanedimethanol; 1 to 35 mole % SPG and 65 to 99 mole % 1,4-cyclohexanedimethanol; 1 to 30 mole % SPG and 70 to 99 mole % 1,4-cyclohexanedimethanol; 1 to 25 mole % SPG and 75 to 99 mole % 1,4-cyclohexanedimethanol; 1 to 20 mole % SPG and 80 to 99 mole % 1,4-cyclohexanedimethanol; 1 to 15 mole % SPG and 85 to 99 mole % 1,4-cyclohexanedimethanol; 1 to 10 mole % SPG and 90 to 99 mole % 1,4-cyclohexanedimethanol; and 1 to 5 mole % SPG and 95 to 99 mole % 1,4-cyclohexanedimethanol.

In other aspects of the invention, the glycol component for the polyesters useful in the invention include but are not limited to at least one of the following combinations of ranges: 5 to 49 mole % SPG and 1 to 51 mole % 1,4-cyclohexanedimethanol; 5 to 45 mole % SPG and 55 to 95 mole % 1,4-cyclohexanedimethanol; 5 to 40 mole % SPG and 60 to 95 mole % 1,4-cyclohexanedimethanol; 5 to 35 mole % SPG and 65 to 95 mole % 1,4-cyclohexanedimethanol; 5 to 30 mole % SPG and 70 to 95 mole % 1,4-cyclohexanedimethanol; 5 to 25 mole % SPG and 75 to 95 mole % 1,4-cyclohexanedimethanol; 5 to 20 mole % SPG and 80 to 95 mole % 1,4-cyclohexanedimethanol; 5 to 15 mole % SPG and 85 to 95 mole % 1,4-cyclohexanedimethanol; and 5 to 10 mole % SPG and 90 to 95 mole % 1,4-cyclohexanedimethanol.

In other aspects of the invention, the glycol component for the polyesters useful in the invention include but are not limited to at least one of the following combinations of ranges: 10 to 49 mole % SPG and 51 to 90 mole % 1,4-cyclohexanedimethanol; 10 to 45 mole % SPG and 55 to 90 mole % 1,4-cyclohexanedimethanol; 10 to 40 mole % SPG and 60 to 90 mole % 1,4-cyclohexanedimethanol; 10 to 35 mole % SPG and 65 to 90 mole % 1,4-cyclohexanedimethanol; 10 to less than 35 mole % SPG and greater than 65 to 90% 1,4-cyclohexanedimethanol; 10 to 30 mole % SPG and 70 to 90 mole % 1,4-cyclohexanedimethanol; 10 to 25 mole % SPG and 75 to 90 mole % 1,4-cyclohexanedimethanol; 10 to 20 mole % SPG and 80 to 90 mole % 1,4-cyclohexanedimethanol; and 10 to 15 mole % SPG and 85 to 90 mole % 1,4-cyclohexanedimethanol.

In other aspects of the invention, the glycol component for the polyesters useful in the invention include but are not limited to at least one of the following combinations of ranges: 15 to 49 mole % SPG and 51 to 85 mole % 1,4-cyclohexanedimethanol; 15 to 45 mole % SPG and 55 to 85 mole % 1,4-cyclohexanedimethanol; 15 to 40 mole % SPG and 60 to 85 mole % 1,4-cyclohexanedimethanol; 15 to 35 mole % SPG and 65 to 85 mole % 1,4-cyclohexanedimethanol; 15 to 30 mole % SPG and 70 to 85 mole % 1,4-cyclohexanedimethanol; 15 to 25 mole % SPG and 75 to 85 mole % 1,4-cyclohexanedimethanol; and 15 to 24 mole % SPG and 76 to 85 mole % 1,4-cyclohexanedimethanol.

In other aspects of the invention, the glycol component for the polyesters useful in the invention include but are not limited to at least one of the following combinations of ranges: 20 to 49 mole % SPG and 51 to 80 mole % 1,4-cyclohexanedimethanol; 20 to 45 mole % SPG and 55 to 80 mole % 1,4-cyclohexanedimethanol; 20 to 40 mole % SPG and 60 to 80 mole % 1,4-cyclohexanedimethanol; 20 to 35 mole % SPG and 65 to 80 mole % 1,4-cyclohexanedimethanol; 20 to 30 mole % SPG and 70 to 80 mole % 1,4-cyclohexanedimethanol; and 20 to 25 mole % SPG and 75 to 80 mole % 1,4-cyclohexanedimethanol.

In other aspects of the invention, the glycol component for the polyesters useful in the invention include but are not limited to at least one of the following combinations of ranges: 25 to 49 mole % SPG and 51 to 75 mole % 1,4-cyclohexanedimethanol; 25 to 45 mole % SPG and 55 to 75 mole % 1,4-cyclohexanedimethanol; 25 to 40 mole % SPG and 60 to 75 mole % 1,4-cyclohexanedimethanol; 25 to 35 mole % SPG and 65 to 75 mole % 1,4-cyclohexanedimethanol; and 25 to 30 mole % SPG and 70 to 75 mole % 1,4-cyclohexanedimethanol.

In other aspects of the invention, the glycol component for the polyesters useful in the invention include but are not limited to at least one of the following combinations of ranges: 30 to 49 mole % SPG and 51 to 70 mole % 1,4-cyclohexanedimethanol; 30 to 45 mole % SPG and 55 to 70 mole % 1,4-cyclohexanedimethanol; 30 to 40 mole % SPG and 60 to 70 mole % 1,4-cyclohexanedimethanol; 30 to 35 mole % SPG and 65 to 70 mole % 1,4-cyclohexanedimethanol.

In other aspects of the invention, the glycol component for the polyesters useful in the invention include but are not limited to at least one of the following combinations of ranges: 35 to 49 mole % SPG and 51 to 65 mole % 1,4-cyclohexanedimethanol; 35 to 45 mole % SPG and 55 to 65 mole % 1,4-cyclohexanedimethanol; 35 to 40 mole % SPG and 60 to 65 mole % 1,4-cyclohexanedimethanol.

In other aspects of the invention, the glycol component for the polyesters useful in the invention include but are not limited to at least one of the following combinations of ranges: 40 to 49 mole % SPG and 51 to 60 mole % 1,4-cyclohexanedimethanol; and 40 to 45 mole % SPG and 55 to 60 mole % 1,4-cyclohexanedimethanol.

For embodiments of the invention, the polyesters useful in the invention may exhibit at least one of the following inherent viscosities as determined in 60/40 (wt/wt) phenol/tetrachloroethane at a concentration of 0.25 g/50 ml at 25° C., 0.50 to 1.2 dL/g; 0.50 to 1.1 dL/g; 0.50 to 1 dL/g; 0.50 to less than 1 dL/g; 0.50 to 0.98 dL/g; 0.50 to 0.95 dL/g; 0.50 to 0.90 dL/g; 0.50 to 0.85 dL/g; 0.50 to 0.80 dL/g; 0.50 to 0.75 dL/g; 0.50 to less than 0.75 dL/g; 0.50 to 0.72 dL/g; 0.50 to 0.70 dL/g; 0.50 to less than 0.70 dL/g; 0.50 to 0.68 dL/g; 0.50 to less than 0.68 dL/g; 0.50 to 0.65 dL/g; 0.55 to 1.2 dL/g; 0.55 to 1.1 dL/g; 0.55 to 1 dL/g; 0.55 to less than 1 dL/g; 0.55 to 0.98 dL/g; 0.55 to 0.95 dL/g; 0.55 to 0.90 dL/g; 0.55 to 0.85 dL/g; 0.55 to 0.80 dL/g; 0.55 to 0.75 dL/g; 0.55 to less than 0.75 dL/g; 0.55 to 0.72 dL/g; 0.55 to 0.70 dL/g; 0.55 to less than 0.70 dL/g; 0.55 to 0.68 dL/g; 0.55 to less than 0.68 dL/g; 0.55 to 0.65 dL/g; 0.58 to 1.2 dL/g; 0.58 to 1.1 dL/g; 0.58 to 1 dL/g; 0.58 to less than 1 dL/g; 0.58 to 0.98 dL/g; 0.58 to 0.95 dL/g; 0.58 to 0.90 dL/g; 0.58 to 0.85 dL/g; 0.58 to 0.80 dL/g; 0.58 to 0.75 dL/g; 0.58 to less than 0.75 dL/g; 0.58 to 0.72 dL/g; 0.58 to 0.70 dL/g; 0.58 to less than 0.70 dL/g; 0.58 to 0.68 dL/g; 0.58 to less than 0.68 dL/g; 0.58 to 0.65 dL/g; 0.60 to 1.2 dL/g; 0.60 to 1.1 dL/g; 0.60 to 1 dL/g; 0.60 to less than 1 dL/g; 0.60 to 0.98 dL/g; 0.60 to 0.95 dL/g; 0.60 to 0.90 dL/g; 0.60 to 0.85 dL/g; 0.60 to 0.80 dL/g; 0.60 to 0.75 dL/g; 0.60 to less than 0.75 dL/g; 0.60 to 0.72 dL/g; 0.60 to 0.70 dL/g; 0.60 to less than 0.70 dL/g; 0.60 to 0.68 dL/g; 0.60 to less than 0.68 dL/g; 0.60 to 0.65 dL/g; 0.65 to 1.2 dL/g; 0.65 to 1.1 dL/g; 0.65 to 1 dL/g; 0.65 to less than 1 dL/g; 0.65 to 0.98 dL/g; 0.65 to 0.95 dL/g; 0.65 to 0.90 dL/g; 0.65 to 0.85 dL/g; 0.65 to 0.80 dL/g; 0.65 to 0.75 dL/g; 0.65 to less than 0.75 dL/g; 0.65 to 0.72 dL/g; 0.65 to 0.70 dL/g; 0.65 to less than 0.70 dL/g; 0.68 to 1.2 dL/g; 0.68 to 1.1 dL/g; 0.68 to 1 dL/g; 0.68 to less than 1 dL/g; 0.68 to 0.98 dL/g; 0.68 to 0.95 dL/g; 0.68 to 0.90 dL/g; 0.68 to 0.85 dL/g; 0.68 to 0.80 dL/g; 0.68 to 0.75 dL/g; 0.68 to less than 0.75 dL/g; 0.68 to 0.72 dL/g.

It is contemplated that compositions useful in the invention can possess at least one of the inherent viscosity ranges described herein and at least one of the monomer ranges for the compositions described herein unless otherwise stated. It is also contemplated that compositions useful in the invention can possess at least one of the $T_g$ ranges described herein and at least one of the monomer ranges for the compositions described herein unless otherwise stated. It is also contemplated that compositions useful in the invention can possess at least one of the inherent viscosity ranges described herein, at least one of the $T_g$ ranges described herein, and at least one of the monomer ranges for the compositions described herein unless otherwise stated.

In one embodiment, terephthalic acid may be used as the starting material. In another embodiment, dimethyl terephthalate may be used as the starting material. In yet another embodiment, mixtures of terephthalic acid and dimethyl terephthalate may be used as the starting material and/or as an intermediate material.

In certain embodiments, terephthalic acid or an ester thereof, such as, for example, dimethyl terephthalate or a mixture of terephthalic acid residues and an ester thereof can make up a portion or all of the dicarboxylic acid component used to form the polyesters useful in the invention. In certain embodiments, terephthalic acid residues can make up a portion or all of the dicarboxylic acid component used to form the polyesters useful in the invention. In certain embodiments, higher amounts of terephthalic acid can be used in order to produce a higher impact strength polyester. For purposes of this disclosure, the terms "terephthalic acid" and "dimethyl terephthalate" are used interchangeably herein. In one embodiment, dimethyl terephthalate is part or all of the dicarboxylic acid component used to make the polyesters useful in the present invention. In all embodiments, ranges of from 70 to 100 mole %; or 80 to 100 mole %; or 90 to 100 mole %; or 99 to 100 mole %; or 100 mole % terephthalic acid and/or dimethyl terephthalate and/or mixtures thereof may be used.

In addition to terephthalic acid, the dicarboxylic acid component of the polyesters useful in the invention can comprise up to 20 mole %, up to 10 mole %, up to 5 mole %, or up to 1 mole % of one or more modifying aromatic dicarboxylic acids. Yet another embodiment contains 0 mole % modifying aromatic dicarboxylic acids. Thus, if present, it is contemplated that the amount of one or more modifying aromatic dicarboxylic acids can range from any of these preceding endpoint values including, for example, 0.01 to 20 mole %, 0.01 to 10 mole %, from 0.01 to 5 mole % and from 0.01 to 1 mole %. In one embodiment, modifying aromatic dicarboxylic acids that may be used in the present invention include but are not limited to those having up to 20 carbon atoms, and which can be linear, para-oriented, or symmetrical. Examples of modifying aromatic dicarboxylic acids which may be used in this invention include, but are not limited to, isophthalic acid, 4,4'-biphenyldicarboxylic acid, 1,4-, 1,5-, 2,6-, 2,7-naphthalenedicarboxylic acid, and trans-4,4'-stilbenedicarboxylic acid, and esters thereof. In one embodiment, the modifying aromatic dicarboxylic acid is isophthalic acid.

The carboxylic acid component of the polyesters useful in the invention can be further modified with such as up to 20 mole %, such as up to 10 mole %, such as up to 5 mole % or up to 1 mole % of one or more aliphatic dicarboxylic acids containing 2-16 carbon atoms, such as, for example, cyclohexanedicarboxylic, malonic, succinic, glutaric, adipic, pimelic, suberic, azelaic and dodecanedioic dicarboxylic acids. Certain embodiments can also comprise 0.01 to 10 mole %, such as 0.1 to 10 mole %, 1 or 10 mole %, 5 to 10 mole % of one or more modifying aliphatic dicarboxylic acids. Yet another embodiment contains 0 mole % modifying aliphatic dicarboxylic acids. The total mole % of the dicarboxylic acid component is 100 mole %. In one embodiment, adipic acid and/or glutaric acid are provided in the modifying aliphatic dicarboxylic acid component of the invention.

Esters of terephthalic acid and the other modifying dicarboxylic acids or their corresponding esters and/or salts may be used instead of the dicarboxylic acids. Suitable examples of dicarboxylic acid esters include, but are not limited to, the dimethyl, diethyl, dipropyl, diisopropyl, dibutyl, and diphenyl esters. In one embodiment, the esters are chosen from at least one of the following: methyl, ethyl, propyl, isopropyl, and phenyl esters.

For the desired polyester, the molar ratio of cis/trans 2,2,4,4-tetramethyl-1,3-cyclobutanediol can vary from the pure form of each and mixtures thereof. In certain embodiments, the molar percentages for cis and/or trans 2,2,4,4,-tetramethyl-1,3-cyclobutanediol are greater than 50 mole % cis and less than 50 mole % trans; or greater than 55 mole % cis and less than 45 mole % trans; or 30 to 70 mole % cis and 70 to 30 mole % trans; or 40 to 60 mole % cis and 60 to 40 mole % trans; or 50 to 70 mole % trans and 50 to 30 mole % cis; or 50 to 70 mole % cis and 50 to 30 mole % trans; or 60 to 70 mole % cis and 30 to 40 mole % trans; or greater than 70 mole % cis and less than 30 mole % trans; wherein the total mole percentages for cis- and trans-2,2,4,4-tetramethyl-1,3-cyclobutanediol is equal to 100 mole %. In an additional embodiment, the molar ratio of cis/trans 2,2,4,4-tetramethyl-1,3-cyclobutanediol can vary within the range of 50/50 to 0/100, for example, between 40/60 to 20/80.

The cyclohexanedimethanol may be cis, trans, or a mixture thereof, for example, a cis/trans ratio of 60:40 to 40:60 or a cis/trans ratio of 70:30 to 30:70. In another embodiment, the trans-cyclohexanedimethanol can be present in an amount of 60 to 80 mole % and the cis-cyclohexanedimethanol can be present in an amount of 20 to 40 mole % wherein the total percentages of cis-cyclohexanedimethanol and trans-cyclohexanedimethanol is equal to 100 mole %. In particular embodiments, the trans-cyclohexanedimethanol can be present in an amount of 60 mole % and the cis-cyclohexanedimethanol can be present in an amount of 40 mole %. In particular embodiments, the trans-cyclohexanedimethanol can be present in an amount of 70 mole % and the cis-cyclohexanedimethanol can be present in an amount of 30 mole %. Any of 1,1-, 1,2-, 1,3-, 1,4-isomers of cyclohexanedimethanol or mixtures thereof may be present in the glycol component of this invention. Cis and trans isomers do not exist for 1,1-cyclohexanedimethanol In one embodiment, the polyesters useful in the invention comprise SPG and 1,4-cyclohexanedimethanol. In another embodiment, the polyesters useful in the invention can comprise SPG, 1,4-cyclohexanedimethanol and 2,2,4,4-tetramethyl-1,3-cyclobutanediol. The molar ratio of cis/trans 1,4-cyclohexandimethanol can vary within the range of 50/50 to 0/100, for example, between 40/60 to 20/80.

In one embodiment, the glycol component of the polyester portion of the polyester compositions useful in the invention can contain 48 mole % or less of one or more modifying glycols which are not SPG or cyclohexanedimethanol; in one embodiment, the glycol component of the polyester portion of the polyester compositions useful in the invention can contain 25 mole % or less of one or more modifying glycols which are not SPG or cyclohexanedimethanol; in one embodiment, the glycol component of the polyester portion of the polyester compositions useful in the invention can contain 20 mole % or less of one or more modifying glycols which are not SPG or cyclohexanedimethanol; in one embodiment, the polyesters useful in the invention may contain less than 15 mole % or of one or more modifying glycols. In another embodiment, the polyesters useful in the invention can contain 10 mole % or less of one or more modifying glycols. In another embodiment, the polyesters useful in the invention can contain 5 mole % or less of one or more modifying glycols. In another embodiment, the polyesters useful in the invention can contain 3 mole % or less of one or more modifying glycols. In another embodiment, the polyesters useful in the invention can contain 2 mole % or less of one or more modifying glycols. In another embodiment, the polyesters useful in the invention can contain 0 mole % modifying glycols.

In one embodiment, ethylene glycol is either not present or is substantially not present in the polyester; by "substantially not present" we mean that the ethylene glycol be present only in an amount which would not cause branching during polyester synthesis or in other words, would have a molecular weight distribution less than 2.5 or less than or equal to around 2 during polyester synthesis in the melt.

Modifying glycols useful in the polyesters useful in the invention refer to diols other than SPG and cyclohexanedimethanol and can contain 2 to 16 carbon atoms. Examples of suitable modifying glycols include, but are not limited to, diethylene glycol, 1,2-propanediol, 1,3-propanediol, neopentyl glycol, 1,4-butanediol, 1,5-pentanediol, 1,6-hexanediol, p-xylene glycol, polytetramethylene glycol, and mixtures thereof. In another embodiment, the modifying glycols include, but are not limited to, at least one of 1,3-propanediol and 1,4-butanediol. In one embodiment, at least one modifying glycol is diethylene glycol. In one embodiment, the diethylene glycol is not added as a separate monomer but is formed during polymerization.

The polyesters useful in the invention can comprise from 0 to 10 mole percent, for example, from 0.01 to 5 mole percent, from 0.01 to 1 mole percent, from 0.05 to 5 mole percent, from 0.05 to 1 mole percent, or from 0.1 to 0.7 mole percent, based the total mole percentages of either the diol or diacid residues; respectively, of one or more residues of a branching monomer, also referred to herein as a branching agent, having 3 or more carboxyl substituents, hydroxyl substituents, or a combination thereof. In certain embodiments, the branching monomer or agent may be added prior to and/or during and/or after the polymerization of the polyester. The polyester(s) useful in the invention can thus be linear or branched. It is understood that when branching agents are present during polymerization of the polyesters of the invention, the polyesters would have a molecular weight distribution of greater than 2.5.

Examples of branching monomers include, but are not limited to, multifunctional acids or multifunctional alcohols such as trimellitic acid, trimellitic anhydride, pyromellitic dianhydride, trimethylolpropane, glycerol, pentaerythritol, citric acid, tartaric acid, 3-hydroxyglutaric acid and the like. In one embodiment, the branching monomer residues can comprise 0.1 to 0.7 mole percent of one or more residues chosen from at least one of the following: trimellitic anhydride, pyromellitic dianhydride, glycerol, sorbitol, 1,2,6-hexanetriol, pentaerythritol, trimethylolethane, and/or trimesic acid. The branching monomer may be added to the polyester reaction mixture or blended with the polyester in the form of a concentrate as described, for example, in U.S. Pat. Nos. 5,654,347 and 5,696,176, whose disclosure regarding branching monomers is incorporated herein by reference. By "multifunctional", we mean that the branching monomers are not mono-functional or difunctional.

The polyesters of the invention can comprise at least one chain extender. Suitable chain extenders include, but are not limited to, multifunctional (including, but not limited to, bifunctional) isocyanates, multifunctional epoxides, including for example epoxylated novolacs, and phenoxy resins. In certain embodiments, chain extenders may be added at the end of the polymerization process or after the polymerization process. If added after the polymerization process, chain extenders can be incorporated by compounding or by addition during conversion processes such as injection molding or extrusion. The amount of chain extender used can vary depending on the specific monomer composition used and the physical properties desired but is generally about 0.1 percent by weight to about 10 percent by weight, such as about 0.1 to about 5 percent by weight, based on the total weight of the polyester.

The glass transition temperature ($T_g$) of the polyesters useful in the invention was determined using a TA DSC 2920 from Thermal Analyst Instrument at a scan rate of 20° C./min.

Because of the long crystallization half-times (e.g., greater than 5 minutes) at 170° C. exhibited by certain polyesters useful in the present invention, it can be possible to produce articles, including but not limited to, injection molded parts, injection blow molded articles, injection stretch blow molded articles, extruded film, extruded sheet, extrusion blow molded articles, extrusion stretch blow molded articles, and fibers. A thermoformable sheet is an example of an article of manufacture provided by this invention. The polyesters of the invention can be amorphous or semicrystalline. In one aspect, certain polyesters useful in the invention can have relatively low crystallinity. Certain polyesters useful in the invention can thus have a substantially amorphous morphology, meaning that the polyesters comprise substantially unordered regions of polymer.

In one embodiment, an "amorphous" polyester can have a crystallization half-time of greater than 5 minutes at 170° C. or greater than 10 minutes at 170° C. or greater than 50 minutes at 170° C. or greater than 100 minutes at 170° C. In one embodiment, of the invention, the crystallization half-times can be greater than 1,000 minutes at 170° C. In another embodiment of the invention, the crystallization half-times of the polyesters useful in the invention can be greater than 10,000 minutes at 170° C. The crystallization half time of the polyester, as used herein, may be measured using methods well-known to persons of skill in the art. For example, the crystallization half time of the polyester, $t_{1/2}$, can be determined by measuring the light transmission of a sample via a laser and photo detector as a function of time on a temperature controlled hot stage. This measurement can be done by exposing the polymers to a temperature, $T_{max}$, and then cooling it to the desired temperature. The sample can then be held at the desired temperature by a hot stage while transmission measurements are made as a function of time. Initially, the sample can be visually clear with high light transmission and becomes opaque as the sample crystallizes. The crystallization half-time is the time at which the light transmission is halfway between the initial transmission and the final transmission. $T_{max}$ is defined as the temperature required to melt the crystalline domains of the sample (if crystalline domains are present). The sample can be heated to $T_{max}$ to condition the sample prior to crystallization half time measurement. The absolute $T_{max}$ temperature is different for each composition. For example PCT can be heated to some temperature greater than 290° C. to melt the crystalline domains.

In one embodiment, certain polyesters useful in this invention can be visually clear. The term "visually clear" is defined herein as an appreciable absence of cloudiness, haziness, and/or muddiness, when inspected visually. In another embodiment, when the polyesters are blended with polycarbonate, including but not limited to, bisphenol A polycarbonates, the blends can be visually clear.

In one embodiment, the polyesters useful in the invention and/or the polyester compositions of the invention, in the presence of and/or in the absence of toner(s), can have color values L*, a* and b* as described herein which can be determined using a Hunter Lab Ultrascan Spectra Colorimeter manufactured by Hunter Associates Lab Inc., Reston, Va. The color determinations are averages of values measured on either pellets of the polyesters or plaques or other items injection molded or extruded from them. They are determined by the L*a*b* color system of the CIE (International Commission on Illumination) (translated), wherein L* represents the lightness coordinate, a* represents the red/green coordinate, and b* represents the yellow/blue coordinate. In certain embodiments, the b* values for the polyesters useful in the invention can be from −12 to less than 12 and the L* values can be from 50 to 90. In other embodiments, the b* values for the polyesters useful in the invention can be present in one of the following ranges: from −10 to 10; −10 to less than 10; −10 to 9; −10 to 8; −10 to 7; −10 to 6; −10 to 5; −10 to 4; −10 to 3; −10 to 2; from −5 to 9; −5 to 8; −5 to 7; −5 to 6; −5 to 5; −5 to 4; −5 to 3; −5 to 2; 0 to 9; 0 to 8; 0 to 7; 0 to 6; 0 to 5; 0 to 4; 0 to 3; 0 to 2; 1 to 10; 1 to 9; 1 to 8; 1 to 7; 1 to 6; 1 to 5; 1 to 4; 1 to 3; and 1 to 2. In other embodiments, the L* value for the polyesters useful in the invention can be present in one of the following ranges: 50 to 60; 50 to 70; 50 to 80; 50 to 90; 60 to 70; 60 to 80; 60 to 90; 70 to 80; 79 to 90.

When phosphorus is added to the polyesters and/or polyester compositions and/or process of making the polyesters of the invention, it is added in the form of a phosphorus compound, for example, at least one phosphate ester(s). The amount of phosphorus compound(s), (for example, at least one phosphate ester), added to the polyesters of the invention and/or polyester compositions of the invention and/or processes of the invention can be measured in the form of phosphorus atoms present in the final polyester, for example, by weight measured in ppm.

Amounts of phosphorus compound(s) added during polymerization and/or post manufacturing can include but are not limited to: 1 to 5000 ppm; 1 to 1000 ppm, 1 to 900 ppm, 1 to 800 ppm, 1 to 700 ppm. 1 to 600 ppm, 1 to 500 ppm, 1 to 400 ppm, 1 to 350 ppm, 1 to 300 ppm, 1 to 250 ppm, 1 to 200 ppm, 1 to 150 ppm, 1 to 100 ppm; 10 to 5000 ppm; 10 to 1000 ppm, 10 to 900 ppm, 10 to 800 ppm, 10 to 700 ppm. 10 to 600 ppm, 10 to 500 ppm, 10 to 400 ppm, 10 to 350 ppm, 10 to 300 ppm, 10 to 250 ppm, 10 to 200 ppm, 10 to 150 ppm, 10 to 100 ppm; based on the total weight of the polyester composition.

In one embodiment, amounts of the phosphate ester of the invention added during polymerization are chosen from the following: 1 to 5000 ppm; 1 to 1000 ppm, 1 to 900 ppm, 1 to 800 ppm, 1 to 700 ppm. 1 to 600 ppm, 1 to 500 ppm, 1 to 400 ppm, 1 to 350 ppm, 1 to 300 ppm, 1 to 250 ppm, 1 to 200 ppm, 1 to 150 ppm, 1 to 100 ppm; 1 to 60 ppm; 2 to 5000 ppm; 2 to 1000 ppm, 2 to 900 ppm, 2 to 800 ppm, 2 to 700 ppm. 2 to 600 ppm, 2 to 500 ppm, 2 to 400 ppm, 2 to 350 ppm, 2 to 300 ppm, 2 to 250 ppm, 2 to 200 ppm, 2 to 150 ppm, 2 to 100 ppm; 2 to 60 ppm; 2 to 20 ppm, 3 to 5000 ppm; 3 to 1000 ppm, 3 to 900 ppm, 3 to 800 ppm, 3 to 700 ppm. 3 to 600 ppm, 3 to 500 ppm, 3 to 400 ppm, 3 to 350 ppm, 3 to 300 ppm, 3 to 250 ppm, 3 to 200 ppm, 3 to 150 ppm, 3 to 100 ppm; 3 to 60 ppm; 3 to 20 ppm, 4 to 5000 ppm; 4 to 1000 ppm, 4 to 900 ppm, 4 to 800 ppm, 4 to 700 ppm, 4 to 600 ppm, 4 to 500 ppm, 4 to 400 ppm, 4 to 350 ppm, 4 to 300 ppm, 4 to 250 ppm, 4 to 200 ppm, 4 to 150 ppm, 4 to 100 ppm; 4 to 60 ppm; 4 to 20 ppm, 5 to 5000 ppm; 5 to 1000 ppm, 5 to 900 ppm, 5 to 800 ppm, 5 to 700 ppm, 5 to 600 ppm, 5 to 500 ppm, 5 to 400 ppm, 5 to 350 ppm, 5 to 300 ppm, 5 to 250 ppm, 5 to 200 ppm, 5 to 150 ppm, 5 to 100 ppm; 5 to 60 ppm; 5 to 20 ppm, 6 to 5000 ppm; 6 to 1000 ppm, 6 to 900 ppm, 6 to 800 ppm, 6 to 700 ppm, 6 to 600 ppm, 6 to 500 ppm, 6 to 400 ppm, 6 to 350 ppm, 6 to 300 ppm, 6 to 250 ppm, 6 to 200 ppm, 6 to 150 ppm, 6 to 100 ppm; 6 to 60 ppm; 6 to 20 ppm, 7 to 5000 ppm; 7 to 1000 ppm, 7 to 900 ppm, 7 to 800 ppm, 7 to 700 ppm, 7 to 600 ppm, 7 to 500 ppm, 7 to 400 ppm, 7 to 350 ppm, 7 to 300 ppm, 7 to 250 ppm, 7 to 200 ppm, 7 to 150 ppm, 7 to 100 ppm; 7 to 60 ppm; 7 to 20 ppm, 8 to 5000 ppm; 8 to 1000 ppm, 8 to 900 ppm, 8 to 800 ppm, 8 to 700 ppm, 8 to 600 ppm, 8 to 500 ppm, 8 to 400 ppm, 8 to 350 ppm, 8 to 300 ppm, 8 to 250 ppm, 8 to 200 ppm, 8 to 150 ppm, 8 to 100 ppm; 8 to 60 ppm; 8 to 20 ppm, 9 to 5000 ppm; 9 to 1000 ppm, 9 to 900 ppm, 9 to 800 ppm, 9 to 700 ppm, 9 to 600 ppm, 9 to 500 ppm, 9 to 400 ppm, 9 to 350 ppm, 9 to 300 ppm, 9 to 250 ppm, 9 to 200 ppm, 9 to 150 ppm, 9 to 100 ppm; 9 to 60 ppm; 9 to 20 ppm, 10 to 5000 ppm; 10 to 1000 ppm, 10 to 900 ppm, 10 to 800 ppm, 10 to 700 ppm. 10 to 600 ppm, 10 to 500 ppm, 10 to 400 ppm, 10 to 350 ppm, 10 to 300 ppm, 10 to 250 ppm, 10 to 200 ppm, 10 to 150 ppm, 10 to 100 ppm, 10 to 60 ppm, 10 to 20 ppm, 50 to 5000 ppm, 50 to 1000 ppm, 50 to 900 ppm, 50 to 800 ppm, 50 to 700 ppm, 50 to 600 ppm, 50 to 500 ppm, 50 to 400 ppm, 50 to 350 ppm, 50 to 300 ppm, 50 to 250 ppm, 50 to 200 ppm, 50 to 150 ppm, 50 to 100 ppm; 50 to 80 ppm, 100 to 5000 ppm, 100 to 1000 ppm, 100 to 900 ppm, 100 to 800 ppm, 100 to 700 ppm, 100 to 600 ppm, 100 to 500 ppm, 100 to 400 ppm, 100 to 350 ppm, 100 to 300 ppm, 100 to 250 ppm, 100 to 200 ppm, 100 to 150 ppm; 150 to 5000 ppm, 150 to 1000 ppm, 150 to 900 ppm, 150 to 800 ppm, 150 to 700 ppm, 150 to 600 ppm, 150 to 500 ppm, 150 to 400 ppm, 150 to 350 ppm, 150 to 300 ppm, 150 to 250 ppm, 150 to 200 ppm, 200 to 5000 ppm, 200 to 1000 ppm, 200 to 900 ppm, 200 to 800 ppm, 200 to 700 ppm, 200 to 600 ppm, 200 to 500 ppm, 200 to 400 ppm, 200 to 350 ppm, 200 to 300 ppm, 200 to 250 ppm, 250 to 5000 ppm, 250 to 1000 ppm, 250 to 900 ppm, 250 to 800 ppm, 250 to 700 ppm, 250 to 600 ppm, 250 to 500 ppm, 250 to 400 ppm, 250 to 350 ppm, 250 to 300 ppm, 500 to 5000 ppm, 300 to 1000 ppm, 300 to 900 ppm, 300 to 800 ppm, 300 to 700 ppm, 300 to 600 ppm, 300 to 500 ppm, 300 to 400 ppm, 300 to 350 ppm, 350 to 5000 ppm, 350 to 1000 ppm, 350 to 900 ppm, 350 to 800 ppm, 350 to 700 ppm, 350 to 600 ppm, 350 to 500 ppm, 350 to 400 ppm; based on the total weight of the polyester composition and as measured in the form of phosphorus atoms in the final polyester.

Catalyst amounts can be included in the processes or compositions of the invention in any amount, unless otherwise described herein, can optionally range from 10 ppm to 20,000 ppm or 10 to 10,000 ppm, or 10 to 5000 ppm or 10 to 1000 ppm or 10 to 500 ppm, or 10 to 300 ppm or 10 to 250 ppm based on the catalyst metal and based on the weight of the final polymer. T In one embodiment, suitable catalysts for use in the processes of the invention to make the polyesters useful in the invention can comprise at least one of organo-zinc compounds, tin compounds and titanium based catalysts, or mixtures thereof. In one embodiment, the catalyst comprises at least one titanium compound. The polyester compositions of the invention may also comprise at least one of the tin compounds useful in the processes of the invention. In one embodiment, the catalyst comprises at least one organo-zinc compound. In one embodiment, the catalyst can comprise a combination of at least one tin compound and at least one titanium compound. In one embodiment, the catalyst consists essentially of at least one tin compound. In one embodiment, the catalyst consists essentially of at least one titanium compound. In one embodiment, the catalyst consists essentially of at least one titanium compound and at least one tin compound. In one embodiment, the tin compound and/or titanium compound can be used in either the esterification reaction or the polycondensation reaction or both reactions. In one embodiment, the catalyst comprises a titanium compound used in the esterification reaction. Optionally, in one embodiment, the titanium compound catalyst is used in amounts of from about 0.005% to about 0.2% by weight based on the weight of the dicarboxylic acid or dicarboxylic acid ester. Optionally, in one embodiment, less than about 700 ppm elemental titanium can be present as residue in the polyester based on the total weight of the final polyester.

When tin is added to the polyesters and/or polyester compositions and/or process of making the polyesters of the invention, it is added to the process of making the polyester in the form of a tin compound. The amount of the tin compound added to the polyesters of the invention and/or polyester compositions of the invention and/or processes of the invention can be measured in the form of tin atoms present in the final polyester, for example, by weight measured in ppm.

When titanium is added to the polyesters and/or polyester compositions and/or process of making the polyesters of the invention, it is added to the process of making the polyester in the form of a titanium compound. The amount of the titanium compound added to the polyesters of the invention and/or polyester compositions of the invention and/or processes of the invention can be measured in the form of titanium atoms present in the final polyester, for example, by weight measured in ppm.

When zinc is added to the polyesters and/or polyester compositions and/or process of making the polyesters of the invention, it is added to the process of making the polyester in the form of an organo-zinc compound. The amount of the zinc compound added to the polyesters of the invention and/or polyester compositions of the invention and/or processes of the invention can be measured in the form of zinc atoms present in the final polyester, for example, by weight measured in ppm.

In another embodiment, the polyesters of the invention can be prepared using at least one tin compound as catalyst(s). For example, see U.S. Pat. No. 2,720,507, where the portion concerning tin catalysts is incorporated herein by reference. These catalysts are tin compounds containing at least one organic radical.

In one embodiment, catalysts useful in the present invention include, but are not limited to, one or more of the following: butyltin tris-2-ethylhexanoate, dibutyltin diacetate, dibutyltin oxide, and dimethyl tin oxide.

Processes for preparing polyesters using tin-based catalysts are well known and described in the aforementioned U.S. Pat. No. 2,720,507.

The titanium-containing compounds useful in this invention include any compound containing titanium including but not limited to: tetraethyl titanate, acetyltripropyl titanate, tetrapropyl titanate, tetrabutyl titanate, polybutyl titanate, 2-ethylhexyltitanate, octyleneglycol titanate, lactate titanate, triethanolamine titanate, acetylacetonate titanate, ethylacetoacetic ester titanate, isostearyl titanate, acetyl triisopropyl titanate, titanium tetraisopropoxide titanium glycolates, titanium butoxide, hexylene glycol titanate, and tetraisooctyl titanate, titanium dioxide, titanium dioxide/silicon dioxide coprecipitates, and titanium dioxide/zirconium dioxide coprecipitates. This invention includes but is not limited to the titanium dioxide/silicon dioxide coprecipitate catalyst described in U.S. Pat. No. 6,559,272.

The polyester portion of the polyester compositions useful in the invention can be made by the known transesterification processes in the melt. Suitable methods include, but are not limited to, the steps of reacting one or more dicarboxylic acids with one or more glycols at a temperature of 100° C. to 315° C. at a pressure of 0.1 to 760 mm Hg for a time sufficient to form a polyester. See U.S. Pat. No. 3,772,405 for methods of producing polyesters, the disclosure regarding such methods is hereby incorporated herein by reference.

The polyester in general may be prepared by condensing the dicarboxylic acid or dicarboxylic acid ester with the glycol in the presence of the titanium catalyst and/or titanium and tin catalysts described herein at elevated temperatures increased gradually during the course of the condensation up to a temperature of about 225°-310° C., in an inert atmosphere, and conducting the condensation at low pressure during the latter part of the condensation, as described in further detail in U.S. Pat. No. 2,720,507 incorporated herein by reference.

In another aspect, this invention relates to a process for preparing copolyesters of the invention. In one embodiment, the process relates to preparing copolyesters comprising terephthalic acid, SPG, and 1,4-cyclohexanedimethanol. In one aspect, this invention relates to a process for preparing a polyester comprising the steps of:

(I) heating a mixture comprising the monomers useful in any of the polyesters useful in the invention in the presence of a catalyst at a temperature of 150 to 240° C. for a time sufficient to produce an initial polyester, wherein said mixture comprises:
   (a) a dicarboxylic acid component comprising:
      (i) about 80 to about 100 mole % of terephthalic acid residues;
      (ii) about 0 to about 20 mole % of aromatic and/or aliphatic dicarboxylic acid residues having up to 20 carbon atoms; and
   (b) a glycol component comprising:
      (i) about 1 to about 49 mole % spiro-glycol residues; and
      (ii) about 51 to about 99 mole % chosen from at least one of 1,4-cyclohexanedimethanol residues and 2,2,4,4-tetramethyl-1,3-cyclobutanediol residues;
wherein the total mole % of the dicarboxylic acid component is 100 mole %, and wherein the total mole % of the glycol component is 100 mole %;

(II) heating the initial polyester of step (I) at a temperature of 240 to 320° C. for 1 to 4 hours; and (III) removing any unreacted glycols.

In one embodiment, during said process, the molecular weight distributions of the polyester are less than 2.5 or equal to or less than 2 as determined by GPC (gel permeation chromatography) as described in the Examples.

Reaction times for the esterification Step (A) are dependent upon the selected temperatures, pressures, and feed mole ratios of glycol to dicarboxylic acid.

In one embodiment, step (A) can be carried out until 50% by weight or more of the SPG has been reacted. Step (A) may be carried out under pressure, ranging from 0 psig to 100 psig. The term "reaction product" as used in connection with any of the catalysts useful in the invention refers to any product of a polycondensation or esterification reaction with the catalyst and any of the monomers used in making the polyester as well as the product of a polycondensation or esterification reaction between the catalyst and any other type of additive.

Typically, Step (B) and Step (C) can be conducted at the same time. These steps can be carried out by methods known in the art such as by placing the reaction mixture under a pressure ranging, from 0.002 psig to below atmospheric pressure, or by blowing hot nitrogen gas over the mixture.

In any of the processes of the invention useful in making the polyesters useful in the invention, at least one phosphorus compound and/or reaction products thereof, and mixtures thereof can be added either during esterification, polycondensation, or both and/or it can be added post-polymerization. In one embodiment, the phosphorus compounds useful in any of the processes of the invention can be added during esterificaton. In one embodiment, if the phosphorus compound(s) useful in the invention is added after both esterification and polycondensation, it is added in the amount of 0.01 to 2 weight % based on the total weight of the final polyester. In one embodiment, the phosphorus compound can comprise at least one phosphate ester. In one embodiment, the phosphorus compound can comprise at least one phosphorus compound which is added during the esterificaton step. In one embodiment, the phosphorus compound can comprise at least one phosphate ester, for example, which is added during the esterificaton step.

It is believed that any of the processes of making the polyesters useful in the invention may be used to make any of the polyesters useful in the invention.

Reaction times for the esterification Step (I) of any of the processes of the invention are dependent upon the selected temperatures, pressures, and feed mole ratios of glycol to dicarboxylic acid.

In any of the process embodiments for making the polyester(s) useful in the invention, the heating time of Step (II) may be from 1 to 5 hours or 1 to 4 hours or 1 to 3 hours or 1.5 to 3 hours or 1 to 2 hours. In one embodiment, the heating time of Step (II) can be from 1.5 to 3 hours.

In one embodiment, any of the polyester(s), polyester compositions and/or processes of the invention may comprise at least one titanium compound.

In one embodiment, any of the polyester(s), polyester compositions and/or processes of the invention may comprise at least one tin compound.

In one embodiment, any of the polyester(s), polyester compositions and/or processes of the invention may comprise at least one titanium compound and at least one phosphorus compound.

In one embodiment, any of the polyester(s), polyester compositions and/or processes of making the polyesters useful in the invention may comprise at least one tin compound and at least one titanium compound.

In one embodiment, any of the polyester(s), polyester compositions and/or processes of making the polyesters useful in the invention may comprise at least one tin compound, at least one titanium compound, and at least one phosphorus compound.

In one embodiment, any of the polyester(s), polyester compositions and/or processes of the invention may comprise at least one organo-zinc compound.

In one embodiment, the amount of tin atoms in the polyesters useful in the invention can be from 0 to 400 ppm tin atoms based on the weight of the final polyester.

In one embodiment, the amount of tin atoms in the polyesters useful in the invention can be from 15 to 400 ppm tin atoms based on the weight of the final polyester.

In one embodiment, the amount of titanium atoms in the polyesters useful in the invention can be from 0 to 400 ppm titanium atoms based on the weight of the final polyester.

In one embodiment, the amount of titanium atoms in the polyesters useful in the invention can be from 15 to 400 ppm titanium atoms based on the weight of the final polyester.

In one embodiment, the amount of phosphorus atoms in the polyesters useful in the invention can be from 1 to 500 ppm phosphorus atoms based on the weight of the final polyester.

In one embodiment, the amount of tin atoms in the polyesters useful in the invention can be from 1 to 400 ppm tin atoms based on the weight of the final polyester and the amount of phosphorus atoms in the final polyesters useful in the invention can be from 1 to 500 ppm phosphorus atoms based on the weight of the final polyester.

In one embodiment, the amount of phosphorus atoms in the polyesters useful in the invention can be from 1 to 500 ppm phosphorus atoms based on the weight of the final polyester and the amount of titanium atoms in the polyester can be from 1 to 400 ppm titanium atoms based on the weight of the final polyester.

In one embodiment, the amount of phosphorus atoms in the polyesters useful in the invention can be from 1 to 500 ppm phosphorus atoms based on the weight of the final polyester and the amount of titanium atoms in the polyester can be from 1 to 100 ppm titanium atoms based on the weight of the final polyester.

In one embodiment, the amount of phosphorus atoms in the polyester(s) useful in the invention can be from 1 to 500 ppm phosphorus atoms based on the weight of the final polyester, the amount of tin atoms in the polyester(s) useful in the invention can be from 1 to 400 ppm tin atoms based on the weight of the final polyester, and the amount of titanium atoms in the polyester can be from 1 to 100 ppm titanium atoms based on the weight of the final polyester.

The invention further relates to the polyester compositions made by the process(es) described above.

The invention further relates to a polymer blend. The blend comprises:

(a) from 5 to 95 weight % of at least one of the polyesters described above; and (b) from 5 to 95 weight % of at least one of the polymeric components.

Suitable examples of the polymeric components include, but are not limited to, nylon; polyesters different than those described herein; polyamides such as ZYTEL® from DuPont; polystyrene; polystyrene copolymers; styrene acrylonitrile copolymers; acrylonitrile butadiene styrene copolymers; poly(methylmethacrylate); acrylic copolymers; poly (ether-imides) such as ULTEM® (a poly(ether-imide) from General Electric); polyphenylene oxides such as poly(2,6-dimethylphenylene oxide) or poly(phenylene oxide)/polystyrene blends such as NORYL 1000® (a blend of poly(2,6-dimethylphenylene oxide) and polystyrene resins from General Electric); polyphenylene sulfides; polyphenylene sulfide/sulfones; poly(ester-carbonates); polycarbonates such as LEXAN® (a polycarbonate from General Electric); polysulfones; polysulfone ethers; and poly(ether-ketones) of aromatic dihydroxy compounds; or mixtures of any of the foregoing polymers. The blends can be prepared by conventional processing techniques known in the art, such as melt blending or solution blending. In one embodiment, polycarbonate is not present in the polyester composition. If polycarbonate is used in a blend in the polyester compositions of the invention, the blends can be visually clear. However, polyester compositions useful in the invention also contemplate the exclusion of polycarbonate as well as the inclusion of polycarbonate.

In addition, the polyester compositions and the polymer blend compositions useful in the invention may, optionally, contain any amount of common additives, for example, from 0.01 to 25% by weight of the overall composition; such as colorants, toner(s), dyes, mold release agents, flame retardants, plasticizers, nucleating agents, stabilizers, including but not limited to, UV stabilizers, thermal stabilizers and/or reaction products thereof, fillers, and impact modifiers. Examples of typical commercially available impact modifiers well known in the art and useful in this invention include, but are not limited to, ethylene/propylene terpolymers, functionalized polyolefins such as those containing methyl acrylate and/or glycidyl methacrylate, styrene-based block copolymeric impact modifiers, and various acrylic core/shell type impact modifiers. Residues of such additives are also contemplated as part of the polyester composition.

In addition, certain agents which colorize the polymer can be added to the melt. In one embodiment, a bluing toner is added to the melt in order to reduce the b* of the resulting polyester polymer melt phase product. Such bluing agents include blue inorganic and organic toner(s). In addition, red toner(s) can also be used to adjust the a* color. Organic toner(s), e.g., blue and red organic toner(s), such as those toner(s) described in U.S. Pat. Nos. 5,372,864 and 5,384,377, which are incorporated by reference in their entirety, can be used. The organic toner(s) can be fed as a premix composition. The premix composition may be a neat blend of the red and blue compounds or the composition may be pre-dissolved or slurried in one of the polyester's raw materials.

The total amount of toner components added depends, of course, on the amount of inherent yellow color in the base polyester and the efficacy of the toner. Generally, a concentration of up to about 15 ppm of combined organic toner components and a minimum concentration of about 0.5 ppm are used. The total amount of bluing additive typically ranges from 0.5 to 10 ppm.

The toner(s) can be added to the esterification zone or to the polycondensation zone. Preferably, the toner(s) are added to the esterification zone or to the early stages of the polycondensation zone, such as to a prepolymerization reactor.

Reinforcing materials may be useful in the compositions of this invention. The reinforcing materials may include, but are not limited to, carbon filaments, silicates, mica, clay, talc, titanium dioxide, Wollastonite, glass flakes, glass beads and fibers, and polymeric fibers and combinations thereof. In one embodiment, the reinforcing materials include glass, such as, fibrous glass filaments, mixtures of glass and talc, glass and mica, and glass and polymeric fibers.

The invention further relates to the film(s) and/or sheet(s) comprising the polyester compositions and/or polymer blends of the invention. The methods of forming the polyesters and/or blends into film(s) and/or sheet(s) are well known in the art. Examples of film(s) and/or sheet(s) of the invention including but not limited to extruded film(s) and/or sheet(s), calendered film(s) and/or sheet(s), compression molded film(s) and/or sheet(s), solution casted film(s) and/or sheet(s). Methods of making film and/or sheet include but are not limited to extrusion, calendering, compression molding, and solution casting.

Examples of potential articles made from film and/or sheet useful in the invention include, but are not limited, to uniaxially stretched film, biaxially stretched film, shrink film (whether or not uniaxially or biaxially stretched), liquid crystal display film (including, but not limited to, diffuser sheets, compensation films and protective films), thermoformed sheet, graphic arts film, outdoor signs, skylights, coating(s), coated articles, painted articles, laminates, laminated articles, and/or multiwall films or sheets.

Multiwall film or sheet refers to sheet extruded as a profile consisting of multiple layers that are connected to each other by means of vertical ribs. Examples of multiwall film or sheet include but are not limited to outdoor shelters (for example, greenhouses and commercial canopies).

Examples of extruded articles comprising the polyester compositions useful in this invention include, but are not limited to, thermoformed sheet, film for graphic arts applications, outdoor signs, skylights, multiwall film, plastic film for plastic glass laminates, and liquid crystal display (LCD) films, including but not limited to, diffuser sheets, compensation films, and protective films for LCDs.

In one embodiment, the present invention comprises a thermoplastic article, typically in the form of sheet material, having a decorative material embedded therein which comprise any of the compositions described herein.

The following examples further illustrate how the polyesters of the invention can be made and evaluated, and are intended to be purely exemplary of the invention and are not intended to limit the scope thereof. Unless indicated otherwise, parts are parts by weight, temperature is in degrees C or is at room temperature, and pressure is at or near atmospheric.

EXAMPLES

Measurement Methods

The inherent viscosity of the polyesters was determined in 60/40 (wt/wt) phenol/tetrachloroethane at a concentration of 0.5 g/100 ml at 25° C., and is reported in dL/g.

Unless stated otherwise, the glass transition temperature ($T_g$) was determined using a TA DSC 2920 instrument from Thermal Analyst Instruments at a scan rate of 20° C./min according to ASTM D3418.

The glycol content and the cis/trans ratio of the compositions were determined by proton nuclear magnetic resonance (NMR) spectroscopy. All NMR spectra were recorded on a JEOL Eclipse Plus 600 MHz nuclear magnetic resonance spectrometer using either chloroform-trifluoroacetic acid (70-30 volume/volume) for polymers or, for oligomeric samples, 60/40(wt/wt) phenol/tetrachloroethane with deuterated chloroform added for lock. Peak assignments for 2,2,4,4-tetramethyl-1,3-cyclobutanediol resonances were made by comparison to model mono- and dibenzoate esters of 2,2,4,4-tetramethyl-1,3-cyclobutanediol. These model compounds closely approximate the resonance positions found in the polymers and oligomers.

Color values reported herein are CIELAB L*, a*, and b* values measured following ASTM D 6290-98 and ASTM E308-99, using measurements from a Hunter Lab Ultrascan XE Spectrophotometer (Hunter Associates Laboratory Inc., Reston, Va.) with the following parameters: (1) D65 illuminant, (2) 10 degree observer, (3) reflectance mode with specular angle included, (4) large area view, (5) 1" port size. Unless stated otherwise, the measurements were performed on polymer granules ground to pass a 6 mm sieve. Haze was measured on 4×4×⅛" plaques according to ASTM D-1003.

The GPC analyses were performed at ambient temperature in a 95/5 vol/vol mixture of methylene chloride and HFIP, containing 0.5 g/l tetraethylammonium nitrate, at a flow rate of 1 ml/min. Sample solutions were prepared by dissolving 4 mg of the polymers in 10 ml of 70/30 vol/vol methylene chloride/HFIP with 10 μl toluene added as a flow rate marker. 10 μl of each solution was injected onto a column set consisting of a 5 μm PLgel Guard column and a 5 μm PLgel Mixed-C column from Polymer Laboratories. Detection was by UV absorbance at a wavelength of 255 nm. The chromatogram was collected and processed with software written at Eastman. The system was calibrated with a series of nearly monodisperse polystyrene standards over a molecular weight range from 580 to 4,000,000 g/mol, and a universal calibration procedure was utilized.

Unless otherwise specified, the cis/trans ratio of the 1,4 cyclohexanedimethanol used in the following examples was approximately 30/70, and could range from 35/65 to 25/75. Unless otherwise specified, the cis/trans ratio of the 2,2,4,4-tetramethyl-1,3-cyclobutanediol used in the following examples was approximately 50/50 and could range from 45/55 to 55/45.

The following abbreviations apply throughout the working examples:

| | |
|---|---|
| CHDM | 1,4-cyclohexanedimethanol |
| EG | Ethylene glycol |
| IV | Inherent viscosity |
| $T_g$ | Glass transition temperature |
| TMCD | 2,2,4,4-tetramethyl-1,3-cyclobutanediol |
| TPA | Terephthalic acid |

Example 1

This example illustrates the preparation of a polyester containing 100 mole % terephthalic acid, 36 mole % spiro-glycol, and 64 mole % 1,4-cyclohexanedimethanol (70/30 trans/cis). A mixture of 58.2 g (0.30 mol) dimethyl terephthalate, 33.9 g of 1,4-cyclohexanedimethanol (0.24 mol), 28.7 g of spiro-glycol (0.09 mol), and 50 ppm Ti based on titanium tetra-isopropoxide was placed in a 500 milliliter flask equipped with an inlet for nitrogen, a metal stirrer, and a short distillation column. The flask was placed in a Wood's metal bath already heated to 220° C. and the contents of the flask were heated at 220° C. for 1.5 hours, then heated to 290° C. over 1 hour. Once at 290° C., a vacuum of 0.3 mm was gradually applied over the next 10 minutes. Full vacuum was maintained for a total time of about 20 minutes to remove excess unreacted diols and build melt viscosity. A high melt viscosity, clear, colorless polymer was obtained with a glass transition temperature of 110° C. and an inherent viscosity of 0.68 dL/g. The molecular weight distribution determined by GPC was 1.96. the b* of this material, ground to pass through a 3 mm screen, is 2.6.

Example 2

This example illustrates the preparation of a polyester containing 100 mole % terephthalic acid, 26 mole % spiro-glycol, 32 mole % 2,2,4,4-tetramethyl-1,3-cyclobutanediol (60/40 cis/trans), and 42 mole % 1,4-cyclohexanedimethanol (70/30 trans/cis). A mixture of 62.1 g (0.32 mol) dimethyl terephthalate, 22.3 g (0.16 mol) of 2,2,4,4-tetramethyl-1,3-cyclobutanediol, 19.4 g (0.13 mol) of 1,4-cyclohexanedimethanol, and 30.1 g of spiro-glycol (0.1 mol), 200 ppm Sn based on butyltin tris(2-ethyl-hexanoate) and 30 ppm P based on triphenylphosphate was placed in a 500 milliliter flask equipped with an inlet for nitrogen, a metal stirrer, and a short distillation column. The flask was placed in a Wood's metal bath already heated to 200° C. and the contents of the flask were heated at 200° C. to 210° C. for 1 hour, then heated to 220° C. over 1 hour, and then to 275° C. over 1.5 hours. Once at 275° C., a vacuum of 0.3 mm was gradually applied over the next 10 minutes. Full vacuum was maintained for a total time of about 80 minutes to remove excess unreacted diols and build melt viscosity. A high melt viscosity, clear, colorless polymer was obtained with a glass transition temperature of 128° C. and an inherent viscosity of 0.61 dL/g. The molecular weight distribution determined by GPC was 2.07

Comparative Example 3

This example illustrates the preparation of a polyester containing 100 mole % terephthalic acid, 45 mole % spiro-glycol, and 55 mole % ethylene glycol. A mixture of 58.2 g (0.15 mol) dimethyl terephthalate, 27.9 g of ethylene glycol (0.45 mol), 45.7 g of spiro-glycol (0.15 mol), and 50 ppm Ti based on titanium tetra-isopropoxide was placed in a 500 milliliter flask equipped with an inlet for nitrogen, a metal stirrer, and a short distillation column. The flask was placed in a Wood's metal bath already heated to 200° C. and the contents of the flask were heated at 200° C. to 210° C. for 1 hour, then heated to 275° C. over 2 hours. Once at 275° C., a vacuum of 0.5 mm was gradually applied over the next 15 minutes. Full vacuum was maintained for a total time of about 15 minutes to remove excess unreacted diols and build melt viscosity. A high melt viscosity, clear, yellow/brown polymer was obtained with a glass transition temperature of 110° C. and an inherent viscosity of 0.76 dL/g. The molecular weight distribution determined by GPC was 4.93.

Comparative Example 4

This example illustrates the preparation of a polyester containing 100 mole % terephthalic acid, 28 mole % spiro-glycol, and 72 mole % ethylene glycol. A mixture of 77.6 g (0.40 mol) dimethyl terephthalate, 42.2 g of ethylene glycol (0.68 mol), 36.5 g of spiro-glycol (0.12 mol), and 50 ppm Ti based on titanium tetra-isopropoxide was placed in a 500 milliliter flask equipped with an inlet for nitrogen, a metal stirrer, and a short distillation column. The flask was placed in a Wood's metal bath already heated to 200° C. and the contents of the flask were heated at 200° C. to 210° C. for 1 hour, then heated to 275° C. over 1.5 hours. Once at 275° C., a vacuum of 0.5 mm was gradually applied over the next 15 minutes. Full vacuum was maintained for a total time of about 18 minutes to remove excess unreacted diols and build melt viscosity. A high melt viscosity, clear, yellow/brown polymer was obtained with a glass transition temperature of 100° C. and an inherent viscosity of 0.80 dL/g. The molecular weight distribution determined by GPC was 4.61. The b* of this material, ground to pass through a 3 mm screen, is 15.3.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A polyester composition comprising at least one polyester which comprises:
    (a) a dicarboxylic acid component comprising:
        (i) about 80 to about 100 mole % of terephthalic acid residues;
        (ii) about 0 to about 20 mole % of aromatic and/or aliphatic dicarboxylic acid residues having up to 20 carbon atoms; and
    (b) a glycol component comprsing:
        (i) about 1 to about 49 mole % of spiro-glycol residues; and
        (ii) about 51 to about 99 mole % of at least one glycol chosen from at least one of 1,4-cyclohexanedimethanol residues and 2,2,4,4-tetramethyl-1,3-cyclobutanediol residues;
    wherein the total mole % of the dicarboxylic acid component is 100 mole %,
    wherein the total mole % of the glycol component is 100 mole %, and
    wherein the molecular weight distribution of the polyester is less than or equal to 2.

2. The polyester composition of claim 1 wherein spiro-glycol is present in the amount of about 20 to about 45 mole %.

3. The polyester composition of Claim 1 wherein spiro-glycol is present in the amount of about 20 to about 40 mole %.

4. The polyester composition of claim 1 wherein spiro-glycol is present in the amount of about 25 to about 40 mole %.

5. The polyester composition of claim 1 wherein the inherent viscosity of the polyester is from 0.5 to 1 dL/g.

6. The polyester composition of claim 1 wherein the inherent viscosity of the polyester is from 0.60 to 0.75 dL/g.

7. The polyester composition of claim 1 wherein the polyester does not contain ethylene glycol.

8. The polyester composition of any of claim 1 wherein the polyester has a $T_g$ of 95° C. to 140° C.

9. The polyester composition of claim 1 wherein the polyester has a $T_g$ of 95° C. to 120° C.

10. The polyester composition of claim 1 wherein the polyester comprises at least one modifying glycol chosen from diethylene glycol, 1,2-propanediol, neopentyl glycol, polytetramethylene glycol, 1,5-pentanediol, 1,6-hexanediol, p-xylene glycol, 1,3-propanediol and 1,4-butanediol or mixtures thereof.

11. The polyester composition of claim 1 wherein the 2,2,4,4-tetramethyl-1,3-cyclobutanediol residues is a mixture comprising 30 to 70 mole % of cis-2,2,4,4-tetramethyl-1,3-cyclobutanediol residues and 30 to 70 mole % of trans-2,2,4,4-tetramethyl-1,3-cyclobutanediol residues.

12. The polyester composition of claim 1 wherein the 2,2,4,4-tetramethyl-1,3-cyclobutanediol residues is a mixture comprising 40 to 60 mole % of cis-2,2,4,4-tetramethyl-1,3- cyclobutanediol residues and 40 to 60 mole % of trans-2,2,4,4-tetramethyl-1,3-cyclobutanediol residues.

13. A blend comprising the polyester composition of claim 1 comprising at least one polymer of poly(etherimides), polyphenylene oxides, poly(phenylene oxide)/polystyrene blends, polystyrene resins, polyphenylene sulfides, polyphenylene sulfide/sulfones, poly(ester-carbonates), polycarbonates, polysulfones; polysulfone ethers, poly(ether-ketones), polyesters other than those of claim 1, and mixtures thereof.

14. The polyester composition of claim 1 wherein the polyester composition comprises at least one additive chosen from colorants, mold release agents, phosphorus compounds plasticizers, nucleating agents, UV stabilizers, glass fibers, carbon fibers, fillers, impact modifiers, or a mixture thereof.

15. The polyester composition of claim 1 wherein the b* color values for the polyesters is from −12 to less than 12 as determined by the L*a*b* color system.

16. An article of manufacture comprising the polyester composition of claim 1 which comprises a film or sheet.

17. An article of manufacture comprising the polyester composition of claim 1 which comprises a thermoformed film or sheet.

18. A process for preparing a polyester comprising the steps of:
  (I) heating a mixture comprising the monomers in the presence of a catalyst at a temperature of 150 to 240° C. for a time sufficient to produce an initial polyester, wherein said mixture comprises:
    (a) a dicarboxylic acid component comprising:
      (i) about 80 to about 100 mole % of terephthalic acid residues;
      (ii) about 0 to about 20 mole % of aromatic and/or aliphatic dicarboxylic acid residues having up to 20 carbon atoms; and
    (b) a glycol component comprising:
      (i) about 1 to about 49 mole % spiro-glycol residues; and
      (ii) about 51 to about 99 mole % of at least one glycol chosen from at least one of 1,4-cyclohexanedimethanol residues and 2,2,4,4-tetramethyl-1,3-cyclobutanediol residues;
  wherein the total mole % of the dicarboxylic acid component is 100 mole %,
  wherein the total mole % of the glycol component is 100 mole %;
  (II) heating the initial polyester of step (I) at a temperature of 240 to 320° C. for 1 to 4 hours; and
  (III) removing any unreacted glycols;
  wherein during said process, the molecular weight distributions of the polyester is less than 2.5.

19. The process according to claim 18, wherein the molecular weight distribution of the polyester is less than or equal to 2.

20. A process for preparing a polyester comprising the steps of:
  (I) heating a mixture of monomers in the presence of a catalyst at a temperature of 150 to 240° C. for a time sufficient to produce an initial polyester, wherein said monomers comprise at least one terephthalic acid and/or esters thereof, at least on glycol comprising 1,4-cyclohexanedimethanol and/or 2,2,4,4-tetramethyl-1,3-cyclobutanediol, and at least one spiro-glycol, wherein said initial polyester comprises:
    (a) a dicarboxylic acid component comprising:
      (i) about 80 to about 100 mole % of terephthalic acid residues;
      (ii) about 0 to about 20 mole % of aromatic and/or aliphatic dicarboxylic acid residues having up to 20 carbon atoms; and
    (b) a glycol component comprising:
      (i) about 1 to about 49 mole % of spiro-glycol residues; and
      (ii) about 51 to about 99 mole % of 1,4-cyclohexanedimethanol residues, 2,2,4,4-tetramethyl-1,3-cyclobutanediol residues, or a combinations thereof;
  wherein the total mole % of the dicarboxylic acid component is 100 mole %, wherein the total mole % of the glycol component is 100 mole %;
  (II) heating the initial polyester of step (I) at a temperature of 240 to 320° C. for 1 to 4 hours to produce said polyester; and
  (III) removing any unreacted glycols.

21. The process of claim 20 wherein said terephthalic esters are selected from one or more of the group consisting of dimethyl, diethyl, dipropyl, diisopropyl, dibutyl, and diphenyl esters.

22. A polyester composition comprising at least one polyester which comprises:
  (a) a dicarboxylic acid component comprising:
    (i) 80 to 100 mole % of terephthalic acid residues;
    (ii) 0 to 20 mole % of aromatic and/or aliphatic dicarboxylic acid residues having up to 20 carbon atoms; and
  (b) a glycol component comprising:
    (i) 1 to 49 mole % of spiro-glycol residues; and
    (ii) 51 to 99 mole % of 1,4-cyclohexanedimethanol residues and 2,2,4,4-tetramethyl-1,3-cyclobutanediol residues;
  wherein the total mole % of the dicarboxylic acid component is 100 mole %, and
  wherein the total mole % of the glycol component is 100 mole %.

* * * * *